(12) United States Patent
Olsen et al.

(10) Patent No.: US 7,496,534 B2
(45) Date of Patent: Feb. 24, 2009

(54) METHODS FOR TRADE DECISION MAKING

(76) Inventors: Richard B. Olsen, Wehrenbachhalde 46, 8053 Zurich (CH); Michel M. Dacorogna, Zollikerstrasse 246, Zurich (CH); Olivier V. Pictet, 9 chemin des Tulipiers, 1208 Geneva (CH); Ulrich A. Müller, Seefeldstrasse 239, 8008 Zurich (CH); Rakhal D. Davé, Ottenbergstrasse 81, 8049 Zurich (CH); Lars A. Jaeger, Krebsgasse 7, 8001 Zurich (CH)

( * ) Notice: Subject to any disclaimer, the term of this patent is extended or adjusted under 35 U.S.C. 154(b) by 1470 days.

(21) Appl. No.: 09/855,633

(22) Filed: May 14, 2001
(Under 37 CFR 1.47)

(65) Prior Publication Data
US 2002/0184134 A1 Dec. 5, 2002

Related U.S. Application Data

(60) Provisional application No. 60/274,174, filed on Mar. 8, 2001.

(51) Int. Cl.
*G06Q 40/00* (2006.01)
(52) U.S. Cl. ................ 705/37; 705/35; 705/36 R
(58) Field of Classification Search ............ 705/35, 705/36 R, 37
See application file for complete search history.

(56) References Cited

U.S. PATENT DOCUMENTS

| | | | | | |
|---|---|---|---|---|---|
| 5,926,822 | A | * | 7/1999 | Garman | ............... 715/503 |
| 6,012,042 | A | * | 1/2000 | Black et al. | ............ 705/36 R |
| 6,016,483 | A | * | 1/2000 | Rickard et al. | ............ 705/36 R |
| 6,061,662 | A | * | 5/2000 | Makivic | ............ 705/36 R |
| 6,195,103 | B1 | * | 2/2001 | Stewart | ............ 345/440 |
| 6,317,728 | B1 | * | 11/2001 | Kane | ............ 705/36 R |
| 6,360,210 | B1 | * | 3/2002 | Wallman | ............ 705/36 R |
| 6,832,210 | B1 | * | 12/2004 | Li | ............ 705/36 R |

OTHER PUBLICATIONS

Brooks, Chris. "A Double-Threshold Garch Model For The French Franc/Deutschmark Exchange Rate", Journal of Forecasting. Chichester: Mar. 2001. vol. 20, Iss. 2; p. 135.*

* cited by examiner

*Primary Examiner*—Harish T. Dass
*Assistant Examiner*—Elda Milef
(74) *Attorney, Agent, or Firm*—Morgan, Lewis & Bockius LLP

(57) ABSTRACT

A method of trading assets on a market including: (1) receiving price data for an asset over one or more computer networks; (2) receiving current system position information; (3) storing the received asset price data and current system position information in a computer-readable medium; (4) calculating trade recommendation information form each of one or more trading sub-models, wherein each sub-model is based on a different time horizon, the calculation based on the received asset price data; and (5) calculating a trade recommendation regarding the asset based on the trade recommendation information from each of the trading sub-models. Each sub-model preferably includes: (1) a price collector component; (2) a price filter component; (3) a price database component; (4) a gearing calculator component; (5) a deal acceptor component; and (6) a book-keeper component.

12 Claims, 8 Drawing Sheets

METHODS FOR TRADE DECISION MAKING

CROSS-REFERENCE TO RELATED APPLICATIONS

This application claims priority to U.S. Provisional Application No. 60/274,174, filed Mar. 8, 2001. The contents of the above application are incorporated herein in their entirety by reference.

FIELD OF THE INVENTION

The subject invention is directed to trading on financial markets, in particular to methods of using real-time trading models to trade on foreign exchange markets.

BACKGROUND

An exchange rate is the price at which one national currency can be exchanged for another. The most common currency value notion is the bilateral exchange rate (or simply the foreign exchange (FX) rate) quoted by an FX trader or reported by a quote vendor. This is a nominal exchange rate because it is the number of units of a currency offered in exchange for one unit of another (for example, 1.5 German marks for 1 U.S. dollar). The spot exchange rate is a particular example of a nominal bilateral exchange rate, where the transaction takes place immediately. Another example is the forward exchange rate, where the price is agreed now but the transaction takes place in the future. An FX price is composed of two quantities: a price at which a bidder offers to buy (termed the bid price) and a price at which a seller offers to buy (the ask price).

The bid and ask prices of major financial institutions are conveyed to dealers' screens by quote vendors such as Reuters, Telerate, or Knight Ridder. Deals are typically negotiated via telephone. The FX market operates globally and around the clock. Any market maker may submit new bid/ask prices at any time, and many institutions have branches worldwide, so that they can participate in continuous FX trading.

Although the FX market operates continuously, individual traders or institutions generally participate in this market for only part of each day. There is thus a need for trading models that take take local business hours and holidays into account.

There is a need for trading models that offer real-time analysis of FX-rate movements and generate explicit trading recommendations. A clear distinction should be made between a price change forecast and an actual trading recommendation. A trading recommendation naturally includes some kind of price change forecast, but must also account for the specific risk profile of the dealer or user of the respective trading model. Another distinction is that a trading model must take into account its past trading history, while a price forecast is not biased by a position the trading model might be in. A trading model thus preferably goes beyond predicting a price change: it should decide whether a certain action has to be taken. This decision is subject to the specific risk profile, the trading history, and institutional constraints such as business hours. These different parameters can be integrated into the decision-making process and are important for constructing practical models for professional traders.

There is a further need for models that follow the FX market and imitate it as closely as possible. These models should be based on data from continuous collection and treatment of FX quotes by market makers around the clock (up to 5000 non-equally-spaced prices per day for the German mark, or the euro, against the U.S. dollar). In order to imitate real-world trading accurately, the models also should take into account transaction costs in their return computation, generally avoid trading outside market working hours, and avoid trading too rapidly.

SUMMARY

A preferred embodiment of the subject invention comprises a system and method for operating a set of real-time trading models. An over-all system that utilizes the subject invention includes mechanisms for data collection, data validation, generation of trading recommendations, communication of these recommendations to user-agents, and graphical presentation of these recommendations on the user-agents.

A preferred trading model is based on a set of indicator computations combined with a collection of rules. The former are functions of the price history. The latter determine the applicability of the indicator computations in generating trading recommendations.

A preferred embodiment comprises a method of trading assets on a market, comprising the steps of: (1) receiving price data for an asset over one or more computer networks; (2) receiving current system position information; (3) storing the received asset price data and current system position information in a computer-readable medium; (4) calculating trade recommendation information from each of one or more trading sub-models, wherein each sub-model is based on a different time horizon, the calculation based on the received asset price data; and (5) calculating a trade recommendation regarding the asset based on the trade recommendation information from each of the trading sub-models. In this embodiment, each sub-model has its own indicator.

A further preferred embodiment comprises a method of trading assets on a market, comprising the steps of: (1) receiving price data for an asset over one or more computer networks; (2) receiving current system position information; (3) storing the received asset price data and current system position information in a computer-readable medium; (4) calculating trade recommendation information from each of one or more trading sub-models, wherein each sub-model is based on a different time of day, the calculation based on the received asset price data; and (5) calculating a trade recommendation regarding the asset based on the trade recommendation information from each of the trading sub-models. In one version of this embodiment, 24 sub-models are used. In another version, each sub-model further comprises a pair of sub-models, each pair consisting of a trend-following sub-model and a contrarian sub-model.

A further preferred embodiment comprises a method of trading assets on a market, comprising the steps of: (1) receiving price data for an asset over one or more computer networks; (2) receiving current system position information; (3) storing the received asset price data and current system position information in a computer-readable medium; (4) calculating trade recommendation information from each of one or more trading sub-models, wherein each sub-model is based on the view and actions of one group of traders in the asset and is further based on its own time horizon, the calculation based on the received asset price data; and (5) calculating a trade recommendation regarding the asset based on the trade recommendation information from each of the trading sub-models. In this embodiment, the step of calculating trade recommendation information from each of one or more trading sub-models comprises, for each sub-model, the following steps: (1) calculating a suitable main indicator for the sub-model, which after application of a nonlinear discretization function provides a first raw gearing; (2) calculating a frequency indicator; (3) calculating a channel indicator; (4) computing a weight to be applied to the raw gearing; and (5) computing a final gearing by multiplying the weight times the raw gearing and then discretizing the product.

In each of these embodiments, each sub-model preferably comprises: (1) a price collector component; (2) a price filter component; (3) a price database component; (4) a gearing calculator component; (5) a deal acceptor component; and (6) a book-keeper component. This overall structure and data-flow of a preferred trading model is depicted in FIG. 1.

DETAILED DESCRIPTION OF PREFERRED EMBODIMENTS

At the most general level, a preferred trading model comprises a set of indicator computations combined with a collection of rules. A detailed description of typical indicators is provided below; indicator computations provide an analysis of past price movements. The indicators are mapped into actual trading positions by applying various rules. For instance, a model may enter a long position if an indicator exceeds a certain threshold. Other rules determine whether a deal may be made at all, and the timing of a recommendation. Thus, indicator computations are based on price history, and a collection of rules determines the applicability of the indicator computations to the generation of trading recommendations.

Figure 1:
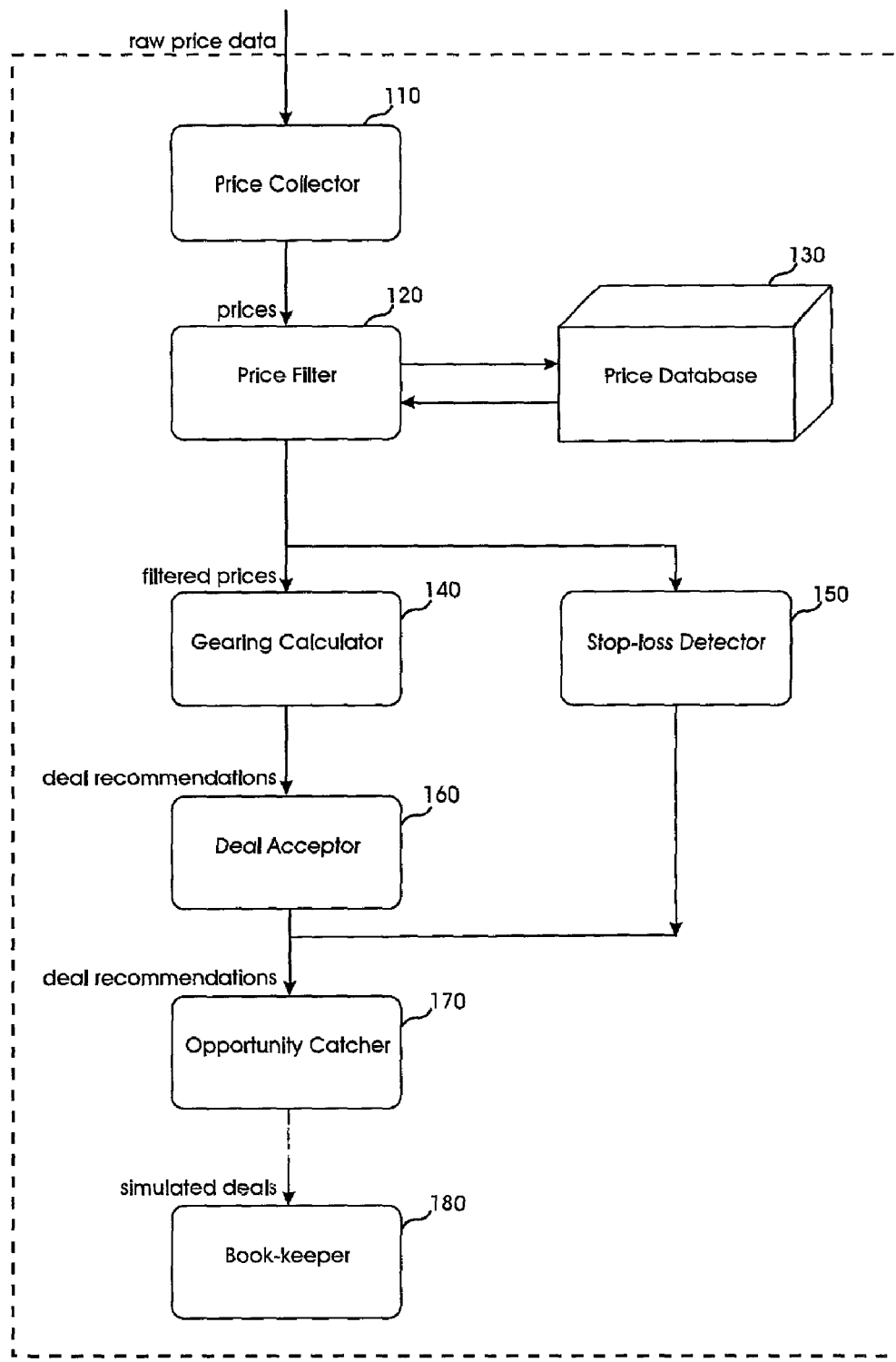
FIG. 1 depicts a data flow and structure diagram of preferred trading model software.

Referring to FIG. 1, in computer software that comprises preferred trading model software, a price collector 110 collects price quotes from data feeds received over a computer network. A price filter 120 receives the collected price quotes and filters them in real-time, storing filtered price quotes in a price database 130 and sending them to a gearing calculator 140. A gearing calculator 140 specifies the recommended gearing (exposure size), based on indicator computations that depend on the received and filtered price quote data, trading rules that depend on past dealing history, current position, and other quantities such as current unrealized return of an open position. Software of preferred embodiments uses the following gearings: −1, −0.5, 0, +0.5, and +1, corresponding to short with all of the available capital, short with half of the available capital, neutral, long with half of the available capital, and long with all of the available capital, respectively. The position is re-evaluated each time a new price quote arrives.

A deal acceptor 160 validates the recommendations of the gearing calculator 140 under the following conditions: (1) no deal may take place within fifteen minutes of a deal already having occurred, and (2) a stringent deal filter determines whether a given price is suitable for dealing. A stop-loss detector 150 triggers if the market moves in the wrong direction and passes a stop-loss price, causing a deal-to-neutral position. The stop-loss price can be adjusted dynamically.

An opportunity catcher 170 searches for a realistic price at which to execute the deal, preferably in a time window of 2-3 minutes (depending on the currency). Then it executes a simulated deal and provides signals to a human dealer. A Book-keeper 180 software module evaluates the trading model statistics.

Imitating the real world requires a system that collects all available price quotes and that reacts in real-time to price movements. In a preferred embodiment of the subject invention, trading models use mainly Reuters data but other data suppliers provide similar information in their FX quotes. A preferred embodiment uses price quotes that have been collected, validated, and stored in a database. Each record or tick in the database contains the following items: (1) the time $t_j$ in GMT (Greenwich Mean Time) at which the price quote has been recorded in the database; (2) the bid price $p_j^{bid}$; (3) the ask price $p_j^{ask}$; (4) the name of the bank that issued the price quote; (5) the location of the issuing bank; and (6) the result of a validation filter.

The index j identifies individual database records. Reuters pages provide the bid price $p_j^{bid}$ as a complete number, usually with five digits; $p_j^{ask}$ is given with only the last two digits and is recomputed in full by software of a preferred embodiment. The granularity of the time stamps $t_j$ is 2 seconds. The validation filter information is preferably computed by the filtering algorithm described in the paper, Müller, U. A., Dacorogna, M. M., Olsen, R. B., Pictet, O. V., Schwarz, M., Morgenegg, C., *Statistical study of foreign exchange rates, empirical evidence of a price change scaling law, and intra-day analysis*, Journal of Banking and Finance, 14:1189 (1990) (hereinafter Müller 1990).

In a preferred embodiment, trading models are each preferably associated with a local market that is identified with a corresponding geographical region. In turn, this region is associated with generally accepted office hours and public vacation days. The local market is assumed to be open at any time during office hours, which do not occur during a weekend or a public holiday. Disclosed trading models support the Zürich, London and Frankfurt markets, but it is straightforward to extend this set. Typical open hours for a model are between 8:00 and 17:30 local time, the exact times depending on the particular local market.

Except for closing an open position if the price hits a stop loss limit (described below)), a preferred model does not deal outside open hours or during holidays. Note: in this description, we speak of a trading model "dealing," or "entering a new position," but preferred trading models do not deal directly (that is, without human intervention), but instead provide trade recommendations to a human dealer.

A preferred embodiment of the subject invention comprises a system and method for operating a set of real-time trading models. These include data collection, data validation, generation of trading recommendations, communication of these recommendations to user-agents residing at customers and graphical presentation of these on the user-agents.

The overall structure and data-flow of a preferred trading model is depicted in FIG. 1.

Indicator computations form a central part of a preferred trading model, providing an analysis of past price movements. These indicators are mapped into actual trading positions by applying various rules. For instance, a model may enter a long position if an indicator exceeds a certain threshold. Other rules determine whether a deal may be made at all. Among various factors, these rules take the timing of the recommendation into consideration.

A complete trading model thus consists of a set of indicator computations combined with a collection of rules. The former are functions of price history. The latter determine the applicability of the indicator computations in generating trading recommendations.

The most significant item displayed to a user-agent is the model's present position or trading recommendation. Preferred trading models make gearing recommendations of S−1.0, S−0.5 (short positions), 0 (neutral), L+0.5 and L+1.0 (long positions). A gearing of S−0.5 means "go short with half the available capital." A gearing of S−1.0 means "go short with all of the available capital."

Software of a preferred embodiment is not constructed as a single huge program with all the required functionality residing in that one entity. Rather it is constructed as a collection of separate programs. In computer-speak, the system is said to be a distributed system because the various programs run in parallel on several computers.

Each such program preferably performs essentially one primary function. For instance, a program termed the GTrader takes in collected and validated price data and uses this data to produce trading model recommendations. (Several trading models may reside independently of one another within one GTrader invocation). Other programs in the system include a price collector for receiving data from the quote-vendors and a price database manager for storing this data for future use. Splitting up the system into several logical components confers several benefits:

One benefit is that a failure in one program is localized and does not affect other programs in the system. This increases the overall reliability. For example, if a GTrader program should crash—hopefully, a rare occurrence but one which may happen as a result of hardware failure—collection of raw price data remains unimpaired.

A second benefit is that if a computer should fail, the programs running on that computer may be transferred to another machine. Again, this promotes reliability. A third benefit is that the performance of the system may be enhanced by adding extra hardware and moving some existing programs onto the new hardware. Finally, a fourth benefit is that having separate programs perform logically distinct operations helps simplify the design and structure of the system.

A gearing calculator lies at the heart of a preferred trading model. The gearing calculator provides the trading model with its intelligence and the ability to capitalize on movements in the FX markets. The gearing calculator also provides the trading model with particular properties. These include the frequency of dealing and the circumstances under which positions may be entered.

In contrast, the other trading model components form a shell around the gearing calculator, providing it with price data, detecting whether the stop-loss limit is hit, and examining the trading recommendations made by the gearing calculator. The gearing calculator re-evaluates its position every time a new price tick is received from the quote-vendors. (As previously noted, a filter preferably validates each price quote beforehand, to eliminate outliers and other implausible data).

The gearing calculator preferably comprises (a) a set of indicators that are produced from the input price data (discussed in detail below); and (b) trading rules that are functions of the past dealing history, the current position, and other quantities (e.g., the current unrealized return of an open position).

As the name suggests, an indicator provides a measure of whether a new position should be entered. Indicators are preferably analyzed by rules inside the gearing calculator, to determine whether such a change of position should in fact take place. In the simplest form, an indicator crossing a predefined threshold may cause a rule to be activated that in turn causes such a change in position to occur. Thus the relative values of the indicators signify internal trading recommendations that are subsequently refined through the application of various rules. Other, more complicated rules may modify the indicators' basic recommendations in additional ways:

1. By inhibiting a recommendation produced by the indicators. For example, if the price movements since the previous deal are too small in either direction, an indicator recommendation to reverse the present gearing is suppressed.
2. By changing the indicator thresholds themselves. While the model is in a neutral position, such a rule may increase the threshold values.
3. By choosing an opposite position to the one hinted at by the indicators. That is, by entering a "contrarian" position. (A contrarian position is long when prices are declining or short when prices are climbing).
4. By imposing new stop-loss values. A smaller stop-loss may be established if the recommended position is contrarian. The stop-loss is reduced because a contrarian strategy is considered risky.

The relative values of the indicators determine the gearing that should be used. That is, not only do the indicators determine the position to be entered (after subsequent transformation by the rules), they also determine the magnitude of the gearing to be used. As stated previously, preferred models employ half-integral gearings in the range −1.0 to 1.0.

Other trading model components supporting the gearing calculator preferably do so through a standardized interface. Newly developed gearing calculators can thus be placed into an existing trading model environment. In addition to embodiments discussed below, at least one preferred embodiment comprises three separate gearing calculators, each working with seven currencies (USD/DEM, USD/CHF, GBP/USD, USD/JPY, USD/ITL, USD/FRF and USD/NLG). These gearing calculators differ in their respective trading frequencies, risk profiles and other properties. Developing a new gearing calculator is thus akin to developing a new trading class while preserving the overall trading model structure. This allows one to customize existing gearing calculators or to experiment with new ones.

The fact that the gearing calculator's indicators and rules suggest entering a new position does not necessarily mean that the model will make such a recommendation. Whether it does or not depends on various secondary rules that then take effect.

These rules are preferably comprised in a deal acceptor, which determines whether the deal proposed by the indicators is allowed to be made. The primary constraint is the timing of the proposed deal. First, no deal other than a stop-loss deal (discussed below) may take place within fifteen minutes of a deal already having occurred. This is to prevent overloading a human dealer who may be following the models. Second, the gearing calculator may make a recommendation to enter a new trading position, but this recommendation can be followed only if the local market is open.

The quality of the most recent price imposes another constraint. A stringent deal-filter determines if a given price is suitable for dealing. This is to ensure that recommended deals are made only with genuine prices rather than extraneous data. The deal acceptor permits a new deal only with a price passing the deal-filter.

If the gearing calculator suggests entering a new position but the deal acceptor decrees otherwise, the suggestion of the gearing calculator is ignored. Eventually, when timing and other factors are right, the gearing calculator will suggest entering a new position and the deal acceptor will approve.

Besides being passed on to a gearing calculator, the filtered price quotes are preferably also sent to a stop-loss detector.

The stop-loss detector triggers if the market moves in the "wrong" direction. If the model enters a trading position because it anticipates that the market will move in a certain direction, but in fact the market then moves the other way, the stop-loss price may be hit.

A preferred trading model defines a stop-loss price when a position is entered. If the current price—that is, the most recent price—moves below the stop-loss price (for a long position) or above the stop-loss price (for a short position), the stop-loss is said to be hit. Hitting the stop-loss causes a deal to a neutral position to be made. In effect, the stop-loss prevents excessive loss of capital should the market go the wrong way.

The stop-loss price may change when a new position is entered or as the current price changes (see below). The current stop-loss price is displayed to a user-agent.

A stop-loss deal may occur at any time, even outside market hours. The assumption is that a position that is kept open outside market hours is handled by a colleague in the American or Far East markets who will deal appropriately if the stop-loss is hit. Should this happen, preferably no further change in position occurs until the local market opens once again.

The concept of stop-profit is associated with that of stop-loss. The stop-loss price starts to move in parallel with the current price once a trading model has achieved a potential profit (3% or slightly less) since entering the latest position. In other words, being in a situation whereby the model could realize such a gain by immediately entering a neutral position causes the stop-loss price to start moving. The difference between the stop-loss and current prices is kept constant as long as the current price continues moving in a direction that increases the potential profit of the open position. Thus, the stop-loss price moves as a ratchet in parallel with the current price. The stop price is allowed to move only during open hours. It is never adjusted when the market is closed.

A preferred model then enters a neutral position if it detects prices slipping backwards. This allows a model to save any profit it has generated rather than lose it when the market abruptly turns. This one-directional movement of the stop-loss price allows the model to capitalize on a price trend.

A preferred trading model may thus make a deal recommendation in two distinct ways. One, the gearing calculator may make a recommendation that is subsequently authorized by the deal acceptor. Two, hitting the stop-loss price activates the stop-loss detector.

Whichever way a deal comes about, the opportunity catcher is activated. The opportunity catcher manifests itself on a user-agent display as an eye-catching signal for the FX dealer to buy or sell according to the recommendation.

While a dealer is actively dealing, the opportunity catcher in the trading model collects the best price with which to deal, either the highest bid price if going from a longer position to a shorter one or the lowest ask price if going from a shorter position to a longer one. This search for the best price lasts for two or three minutes depending on the currency, the assumption being that a quoted price has a useful lifetime of about two or three minutes even if it is superseded by later quotes.

After the two- or three-minute search period, a second signal appears on the user-agent display signifying that the trading model has made a simulated deal using the best price found by the opportunity catcher. The FX dealer then concludes his deal-making activities and waits until the trading model produces another recommendation.

Preferably, the opportunity catcher is not activated for a stop-loss deal occurring outside market hours. In such a case the trading model deals directly. A human trader following the model should then make a corresponding deal for himself as quickly as possible.

In a preferred embodiment, a Book-keeper makes simulated deals on behalf of the trading model. It keeps track of all deals that have been made and evaluates statistics demonstrating the performance of the trading model.

An important variable used by a Book-keeper is the average price $\bar{p}$ paid for achieving the current gearing. After a new deal with index t, this quantity depends on the type of transaction as follows:

$$\bar{p}_t \equiv \begin{cases} \bar{p}_{t-1} & \text{if } |g_t| < |g_{t-1}| \wedge g_t g_{t-1} > 0 \\ g_t \left[ \frac{g_t - g_{t-1}}{p_t} + \frac{g_{t-1}}{\bar{p}_{t-1}} \right]^{-1} & \text{if } |g_t| > |g_{t-1}| \wedge g_t g_{t-1} > 0 \\ p_t & \text{if } g_t g_{t-1} < 0 \vee g_{t-1} = 0 \\ \text{undefined} & \text{if } g_t = 0 \end{cases} \quad (1)$$

where $g_{t-1}$ and $g_t$ are the previous and current gearings, respectively, $p_t$ is the current transaction price, and $\bar{p}_{t-1}$ the average price before the deal. In the initial case, when the current gearing is neutral, the average price $\bar{p}$ is not yet defined.

The average price $\bar{p}$ is needed to compute a quantity central to a preferred trading model—the return of a deal:

$$r_t \equiv (g_{t-1} - g_t)\left(\frac{p_t}{\bar{p}_{t-1}} - 1\right) \quad (2)$$

There are deals with no returns: those starting from a neutral gearing, $g_{t-1}=0$, and those increasing the absolute value of the gearing while keeping its sign. In these cases, eq. (2) does not apply (whereas eq. (1) applies to all deals).

Both of the above equations allow the computation of a set of other quantities that are important for the different trading rules and for the performance evaluation of the models and which are computed in the book-keeper. These are the following:

the current-return $r_c$. This is the unrealized return of a transaction when the current position is off the equilibrium ($g_t \neq 0$). If $p_c$ is the current market price required for going back to neutral, generalizing eq. 2 yields the current-return, $$r_c \equiv g_t\left(\frac{p_c}{\bar{p}_t} - 1\right) \quad (3)$$

the maximum return when open is the maximum value of $r_c$ from a transaction t to a transaction t+1 reached during opening hours, the minimum return when open is the minimum value of $r_c$ from a transaction t to a transaction t+1 reached during opening hours, the total return is a measure of the overall success of a trading model over a period T and is simply equal to, $$R_T \equiv \sum_{i=1}^{n} r_i \qquad (4)$$

where n is the total number of transactions that generated a return during the period T. The total return expresses the amount of gains made by a trader who would always invest up to his initial capital or credit limit in his home currency.

the cumulated return is another measure of the overall success of a trading model wherein the trader always reinvests up to his current capital including gains or losses, $$C_T \equiv \prod_{i=1}^{n} (1 + r_i) - 1 \qquad (5)$$

This quantity is slightly more erratic than the total return.

the maximum drawdown $D_T$ over a certain period $T = t_E - t_0$. It is defined as $$D_T = \max(R_{t_a} - R_{t_b} | t_0 \leq t_a \leq t_b \leq t_E) \qquad (6)$$

where $R_{t_a}$ and $R_{t_b}$ are the total returns of the periods from $t_0$ to $t_a$ and $t_b$ respectively.

the profit over loss ratio gives an idea of the type of strategy used by the model. Its definition is:

$$\frac{P_T}{L_T} \equiv \frac{N_T(r_i | r_i > 0)}{N_T(r_i | r_i < 0)} \qquad (7)$$

where $N_T$ is a function that gives the number of elements of a particular set of variables under certain conditions during a period T.

The book-keeper can also compute other quantities, but they are not central to the invention. Another book-keeper function is to save the trading history of a particular model so it can be retrieved at any time by a user-agent.

In a preferred embodiment, status and simulation messages are issued as appropriate to keep the FX dealer informed of the trading models' states and of any likely deals.

Status messages typically give advance warning of the market opening or closing, or notification if the market is already closed. These messages also indicate whether the supply of raw price data from the commercial market quoters to the trading models has been disrupted for any reason.

Simulation messages give advance notification of a probable deal. A deal is considered to be probable if the market continues its present trend for half an hour or so.

Preferred trading models are event-driven. This means that each model is preferably implemented in terms of defined actions that are triggered when some external event occurs. An external event might be the receipt of a new price from the commercial quote-vendors, or it might be a timer event such as a local market opening or closing.

This event-driven characteristic of the trading models suggests an implementation in terms of a data-flow paradigm. Reception of a new price or a timer event causes some defined actions to be triggered and these, in turn, cause other actions to be triggered. An action may, for example, be a calculation with a new input price, generation of a new trading recommendation, or the transfer of computed data to user-agents. This process continues recursively, one action triggering others, until all dependent actions are executed.

Preferred trading models are therefore preferably implemented in a computer language (such as C++) that supports such a data-flow paradigm.

An input stream to software of a preferred embodiment provides price data and other input in the form of variables being updated. Dependent expressions are then recursively evaluated before new price data is subsequently provided.

In a preferred trading model environment, rules provide a way of ensuring that the separate components such as the opportunity catcher, deal-acceptor, simulation, and so on do not interfere with one another. For example, simulation is disabled while the opportunity catcher is running. Such separation of activities is implemented in terms of meta-rules. These are rules that monitor the activity of the other rules and expressions within the trading model code. Depending on what is happening inside the trading models, the meta-rules set priorities of other rules thereby enabling or disabling other components. In short, inclusion of meta-rules prevents the various trading model components from chaotically disrupting one another.

As noted above, the indicators form a pivotal component of the gearing calculator and hence of the dealing decision process. An indicator is a function only of time and the price history. It summarizes relevant information of the past price movements in the form of a single variable.

The indicator definition needs a time scale on which the price history is analyzed. The usual physical time scale t is inappropriate. For example, the market perceives a price history differently when it covers two working days in one case and two weekend days (Saturday and Sunday) in another, even if the price curves against t have the same form in both cases. A business time scale, related to business activity, is a better choice for analyzing price history.

Changing the time scale can be viewed as an opportunity to introduce some of the "fundamentals" that are missing in conventional time series analysis. These fundamental economic variables certainly have an influence on price movements, but their individual and combined effects are difficult to isolate and thus to replicate. Their impact can be better seen, however, if one views price movements as indelible "footprints" left by these variables. A time scale based on price movements may therefore be used to capture the tracks left by economic factors.

Conventional business-time scales are quite simple: they omit inactive periods such as weekends and count only the business hours. A subtler "modified business time" scale is achieved by expanding periods of high activity and contracting but not omitting periods of low activity.

The 24 hour FX market indeed has periods of low activity (for example, the noon break in East Asia) and high activity (for example, when the European and American business hours overlap). In (Müller 1990), a modified business time scale called σ-time was introduced, modeling the daily and weekly fluctuations of FX activity. This σ-time is used in preferred embodiments of the subject invention as the time scale for indicator computations.

The σ-time model considers business activity in terms of statistical means of absolute price movements (a volatility measure). Hourly or daily FX transaction volume figures would be another alternative for measuring business activity, but such data is generally unavailable. The discussion in Dacorogna, M. M., Müller, U. A., Nagler, R. J., Olsen, R. B., & Pictet, O. V., *A geographical model for the daily and weekly seasonal volatility in the FX market*, Journal of International Money and Finance, 12(4), 413-438 (1993) (Dacorogna 1993) argues for using price movements in a business time scale.

FX activity exhibits distinct daily and weekly seasonal heteroskedasticity, which can be attributed to the changing presence of traders on the FX markets. The σ-time model of a preferred embodiment defines the activity a(t) as the sum of three activity functions $a_k(t)$, corresponding to three sub-markets of the worldwide FX market that are geographically centered in East Asia, Europe and North America. More precisely, the $a_k(t)$ are functions of the time of day and of the day of the week (working day or weekend day). The σ-time is the integral of a(t) over physical time t.

When the three sub-markets model is used, hourly absolute price changes lose their seasonality when analyzed against σ-time instead of t.

In addition to the daily and weekly seasonal heteroskedasticity, FX prices also exhibit non-seasonal heteroskedasticity in the form of clusters of high or low volatility. The σ-time model of a preferred embodiment does not take these into account. Therefore, σ has a regular pattern with a period of 1 week, and may also be determined for the future. It is calibrated so that one full week in σ-time corresponds to one week in physical time t. Hence, it can be measured in the same units as t: seconds, minutes, hours, days, weeks or years. Further details on the modified business time σ can be found in (Dacorogna 1993).

In a preferred embodiment, one trading model indicator is defined as a momentum—the difference of the current logarithmic middle price x and its moving average (MA) computed in σ-time:

$$m_x(\Delta\sigma_r, \sigma) \equiv x - MA_x(\Delta\sigma_r, \sigma), \quad (8)$$

where $\Delta\sigma_r$ is the MA range, a measure related to the length of past time covered by the MA. The moving average is a useful tool for summarizing the past behavior of a time series at any time point. An alternative definition (not used herein) of a momentum would be the difference of two moving averages with different ranges.

A special moving average operator (described below) is used in a preferred embodiment. Among the MAs, the exponentially weighted moving average (EMA) plays an important role. Its weighting function declines exponentially with the time difference of past observations from the present. Sequential EMAs along a time series are straight-forward to calculate with the help of a recursion formula; this is more efficient than the computation of differently weighted MAs.

Although moving averages are well known for homogeneous time series (for instance, see GRANGER, C. W. J & NEWBOLD, P., FORECASTING ECONOMIC TIME SERIES (1977)), their formalism is much less developed for continuous time series, to which preferred embodiments of the subject invention are addressed. Tick-by-tick data is not equally spaced over time (neither t nor σ), but can be interpolated in the time intervals between the price quotes. A preferred embodiment uses linear interpolation in σ-time as the interpolation method. In an alternative embodiments, the previous quote is taken as a function value for the whole interval.

Through interpolation, a continuous time function x(σ) is arrived at, for which the EMA is an integral:

$$EMA_x(\Delta\vartheta_r, \vartheta_c) \equiv \frac{1}{\Delta\vartheta_r} \int_{-\infty}^{\vartheta_c} e^{\frac{\vartheta_c - \vartheta}{\Delta\vartheta_r}} x(\vartheta) d\vartheta, \quad (9)$$

where c is the index of the current time series element and the range $\Delta\sigma_r$ is the center of gravity of the EMA weighting function. This EMA can be computed efficiently with a recursion formula:

$$EMA_x(\Delta\sigma_r, \sigma_c) = \mu EMA_x(\Delta\sigma_r, \sigma_{c-1}) + (1-\mu)x_c + (\mu-\nu)\Delta x_c, \quad (10)$$

where $\Delta x_c$ is defined as $x_c - x_{c-1}$. For a time series representing a function with all types of interpolation, $$\mu = e^{-\alpha} = e^{-\frac{\Delta\vartheta_c}{\Delta\vartheta_r}}, \quad (11)$$

where the time interval $\Delta\sigma_c$ is defined as $\sigma_c - \sigma_{c-1}$; and $$\nu = \frac{1 - e^{-\alpha}}{\alpha} = \frac{1-\mu}{\alpha} \quad (12)$$

This is valid under the assumption of linear interpolation between subsequent series elements. If the function value within such an interval is assumed to be constant and equal to the preceding series element, then the recursion formula also applies by setting ν=1 instead of equal to the right-hand side of eq. (12).

Together with the recursion formulae, the initial EMA value must also be specified. There is usually no information before the first series element $x_1$, so it thus becomes the natural choice for the initialization:

$$EMA_x(\Delta\sigma_r, \sigma_1) = x_1. \quad (13)$$

The error made by this initialization declines by a factor $e^{-(\sigma_c - \sigma_1)/\Delta\sigma_r}$. A part of the data must therefore be reserved to build up the EMAs, so that this error can be made small.

The exponential weighting function with its steeply increasing form gives a strong weight to the recent past, which may contain noisy short-term price movement structures. These can lead to inaccurate trading signals. For this reason other, less-peaked MA weighting functions are often more successful.

Different MA weighting functions can be obtained by repeated application of the EMA operator. The EMA operator yields a result of the same mathematical nature as its input: a time series. Because of this property, the EMA operator can be applied iteratively. The result at each stage is a moving average (MA) with a weighting function more complicated than a simple exponential function:

$$EMA_x^{(n)} = EMA(EMA_x^{(n-1)}(\Delta\sigma_r, \sigma_c)) \quad (14)$$

where $EMA_x^{(0)}(\Delta\sigma_r, \sigma_c) \equiv x_c$. The order of the EMA operator (how many times the simple EMA operator is applied) determines the kind of weighting applied to the past prices.

In a preferred embodiment, the moving average is the mean of EMAs of different orders:

$$EMA_x^{(m,n)} \equiv \frac{1}{n-m+1} \sum_{i=m}^{n} EMA_x^{(i)}(\Delta\vartheta_r, \vartheta) \qquad (15)$$

This MA has a weighting function with the center of gravity at $(m+n)\Delta\sigma_r/2$. The weighting function has the following properties: (1) a low weight for the most recent past; (2) a wide, plateau-like weight maximum at time points around the center of gravity (no sharp peak); and (3) a rapidly but smoothly declining weight for more distant times.

The indicator is a momentum in the sense of eq. (8):

$$I_x = \frac{1}{s(\Delta\vartheta_r, m, n)} (x - EMA_x^{(m,n)}), \qquad (16)$$

where $s(\Delta\sigma_r, m, n)$ is a scaling factor.

Trading signals are given when the indicator $I_x$ crosses over certain threshold values. There are two types of trading signals. The first type are trend signals. These are recommendations to follow the trend indicated by $I_x$. Good threshold values are somewhat low so that trends can be detected relatively early. A "buy" signal is given when $I_x$ exceeds such a value, a "sell" signal when $I_x$ exceeds the corresponding negative value.

The second type of trading signals are overbought/oversold signals. These are contrarian instructions—to stop following an old trend, or to take the opposite position. Good threshold values for these signals are high, at levels that are only exceptionally reached by $I_x$. "Overbought" refers to high positive values, "oversold" to high negative ones.

Preferred trading models use several threshold values of both types. Different threshold values are used in different situations, depending on the current position of the trading model and other internal variables of the decision-making process. Some trading signals recommend taking a new position with full gearing, others a new position with only half gearing, again depending on certain internal conditions of the decision-making process. In many cases, the decision-making process does not follow a trading signal because another decision rule has precedence, as discussed above.

Trading models used in a preferred embodiment are designed for use in a real-time service. However, for testing purposes, for tuning the trading models and for producing statistics, a more stable, reproducible environment is required. Thus, preferred trading models can be driven from a database of historical price data. That is, the defined actions are triggered as though they were being fed from a real-time stream. The trick here is to use the historical price database to form a stream of combined price and timer events. In other words, the timer events are simulated from the historical prices.

This interchangeability between historical and real-time modes is invaluable for the trading model developer. Once a new gearing calculator has been produced, for example, the developer can test it using historical price data. Without making any code changes, he can then switch the trading model into real-time mode so that it then reacts to new price data as they become available.

Optimizing trading models to have minimum overfitting is a difficult task. Overfitting means building the indicators to fit a set of past data so well that they are no longer of general value: instead of modeling the principles underlying the price movement, they model the specific price moves observed during a particular time period. Such a model usually exhibits a totally different behavior or may fail to perform out-of-sample; that is, with data that was not used for the optimization process. To avoid overfitting during optimization, a good measure of the trading model performance is needed, and robust optimization and testing procedures must be used. A strict division of the available historical data used in the different phases of optimization and testing is also important.

The first step is to define a value describing the trading model performance in order to minimize the risk of overfitting in the in-sample period and also to be able to compare different trading models against one other. The performance of a trading model cannot be judged by its total return only; the relevant issue is the overall risk profile. We need a measure of the trading model performance that takes into account the following requirements: (a) the best total return; (b) a smooth, almost linear increase of the total return over time; (c) a small clustering of losses; and (d) no bias towards low frequency trading models.

A measure frequently used to evaluate portfolio models is the Sharpe index. Unfortunately, this measure neglects the risk due to unrealized losses while the model stays in one position. It also introduces a bias in favor of models with a low dealing frequency. Furthermore the Sharpe index is numerically unstable for small variance of returns and cannot consider the clustering of profit-and-loss trades. This measure clearly does not fulfill the above requirements. In the description below, we present a measure of the trading model performance that is risk-sensitive and indicates the stability of returns.

As a basis of our risk-sensitive performance measure, a new trading model return variable R is defined to be the sum of the total return R (eq. (4)) and the non-realized current return $r_c$ (eq. (3)). The variable $\tilde{R}$ is more continuous over time than R and reflects the additional risk due to non-realized returns. Its change over a test time interval $\Delta t$ is termed $X_{\Delta t}$:

$$X_{\Delta t} = \tilde{R}(t) - \tilde{R}(t - \Delta t), \text{ where } \tilde{R}(t) = R(t) + r(t) \qquad (17)$$

We can make N independent observations of $X_{\Delta t}$ within a total test period $\Delta T$, where $$\Delta t = \frac{\Delta T}{N} \qquad (18)$$

A risk-sensitive performance measure of the trading model comparable to the average return can be derived from the utility function formalism of KEENEY, R. L., & RAIFFA, H., DECISION WITH MULTIPLE OBJECTIVES: PREFERENCES AND OTHER TRADEOFFS (1976) (hereinafter Keeney 1976). In a preferred embodiment, we assume that the variable $X_{\Delta t}$ is stochastic and follows a Gaussian random walk about its mean value $\overline{X}_{\Delta t}$ and that the risk aversion C is constant with respect to $X_{\Delta t}$. The resulting utility $u(X_{\Delta t})$ of an observation is $-\exp(-CX_{\Delta t})$, with an expectation value of $\overline{u} = u(\overline{X}_{\Delta t}) \exp(C^2 \sigma^2_{\Delta t}/2)$, where $\sigma^2_{\Delta t}$ is the variance of $X_{\Delta t}$. This expectation of the utility can be transformed back to a variable termed the effective return: $X_{\mathit{eff},\Delta t} = -\log(-\overline{u})/C$. The following definition is obtained:

$$X_{\mathit{eff},\Delta t} = \overline{X}_{\Delta t} - \frac{C\sigma^2_{\Delta t}}{2} \qquad (19)$$

The risk term $C\sigma^2_{\Delta t}/2$ can be regarded as a risk premium deducted from the original return. The variance is computed from the sample:

$$\sigma^2_{\Delta t} = \frac{N}{N-1}\left(\overline{X^2_{\Delta t}} - \overline{X}^2_{\Delta t}\right) \qquad (20)$$

For a particular time horizon $\Delta t$, the variable $X_{\mathit{eff},\Delta t}$ is our new measure of trading model performance including risk. Unlike the Sharpe index, this measure is numerically stable and can differentiate between two trading models with a straight line behavior ($\sigma^2_{\Delta t}=0$) by choosing the one with the best average return. Moreover, the definition given in eq. (19) gives the book-keeping details of a trade a smaller role than the Sharpe index because $X_{\Delta t}$ also contains elements of the current return and is computed at regular time intervals $\Delta t$.

The measure $X_{\mathit{eff},\Delta t}$ still depends on the size of the time interval $\Delta t$. It is hard to compare $X_{\mathit{eff},\Delta t}$ values for different intervals. The usual way to enable comparisons between different intervals is through annualization: multiplication by the annualization factor, $A_{\Delta t}=1\ \text{year}/\Delta t$, $$X_{\mathit{eff},ann,\Delta t} = A_{\Delta t} X_{\mathit{eff},\Delta t} = \overline{X} - \frac{C}{2} A_{\Delta t}\sigma^2_{\Delta t} \qquad (21)$$

where $\overline{X}$ is the annualized return, no longer dependent on $\Delta t$. In the second term of the last form of eq. (21), we find the factor $A_{\Delta t}\sigma^2_{\Delta t}$. This factor has a constant expectation, independent of $\Delta t$, if the return function $R(t)$ is assumed to follow a Gaussian random walk in addition to a linear drift. For such a return function (our reference case), we introduce the condition that the expectation of $X_{\mathit{eff},ann,\Delta t}$ must not depend on $\Delta t$. This condition is fulfilled only if the risk aversion C is constant, that is, independent of $\Delta t$. Annualized effective returns $X_{\mathit{eff},ann}$, computed for different intervals $\Delta t$ by eq. (21) with a constant C value, can therefore be directly compared.

This measure, though annualized by eq. (21), still has a risk term associated with $\Delta t$ and is insensitive to changes occurring with much longer or much shorter horizons. To achieve a measure that simultaneously considers a wide range of horizons, we introduce a weighted average of several $X_{\mathit{eff},ann}$ computed with n different time horizons $\Delta t_i$, and thus take advantage of the fact that annualized $X_{\mathit{eff},ann}$ can be directly compared:

$$X_{\mathit{eff}} = \frac{\sum_{i=1}^{n} w_i X_{\mathit{eff},ann,\Delta t_i}}{\sum_{i=1}^{n} w_i} \qquad (22)$$

where the weights $w_i$ can be chosen according to the relative importance of the time horizons $\Delta t_i$ and may differ for trading models with different trading frequencies. Substituting $X_{\mathit{eff},ann}$ by its expression (eq. 21), $X_{\mathit{eff}}$ becomes $$X_{\mathit{eff}} = \overline{X} - \frac{C}{2}\sum_{i=1}^{n}\frac{w_i A_i \frac{\sigma^2_i}{\Delta t_i}}{\sum_{i=1}^{n} w_i} \qquad (23)$$

where the variance $\sigma_i^2$ is computed with eq. 20 for the time horizon $\Delta t_i$, and $A_i$ is the corresponding annualization factor ($=1\ \text{year}/\Delta t_i$). Because $\sigma_i^2 \geq 0$, we have $X_{\mathit{eff}} \leq \overline{X}$. By empirically balancing risk and return of some test trading models, we found values between 0.08 and 0.15 to be reasonable for C.

By adopting this new measure, we depart from the formal utility function theory defined by (Keeney 1976). That theory is based on the additivity of utilities, but in eq. (22), we average effective returns (which are non-linear functions of utilities). Nevertheless, we choose this definition because we do not see the utility of each horizon as a component of a meta-utility but rather as representing a typical segment of the market. If one of these segments endures a bad phase, its influence on the overall outcome need not be over-proportional, which would be the case if we kept the formalism of additive utilities.

In the discussion of eq. (21), we have shown that the risk aversion C has no systematic dependence on the horizon $\Delta t_i$. However, dealers using a trading model might perceive differently the risks of various horizons. We might introduce special C values for individual horizons according to their trading preferences. However, we can achieve an equivalent effect by changing the weights $w_i$, which are already differentiated for each horizon. These weights reflect the importance of the horizons in terms of the risk sensitivity associated with each horizon.

Specifically, in a preferred performance measure, a standard weighting function is used which determines the weights $w_i$ and thus the relative importance of the different horizons:

$$w(\Delta t) = \frac{1}{2 + \left(\log \frac{\Delta t}{90\ \text{days}}\right)^2} \qquad (24)$$

The weight maximum is set to a 90 days horizon in order to give sufficient importance to the short horizons compared with the long ones. This weighting function is designed to be applied to horizons $\Delta t_i$ in a roughly geometric sequence.

An approximately geometric sequence of n horizons $\Delta t_i$ is chosen with the following construction. Once a testing period (full sample of size $\Delta T$) has been established, it is divided by 4. If this division results in a time horizon longer than 2 years, then the result is divided by 2 and so on, until a horizon $\Delta t_1$ strictly shorter than 2 years is reached. We limit this highest horizon because dealers usually close their books after one year and are less sensitive to return clustering on longer horizons. The next horizon is obtained by a division by 2 of the previous one and so on until a last horizon between 5 to 10 days is reached; this shortest horizon is then forced to be $\Delta t_n = 7$ days. All horizons are truncated to full days. If there is no integer multiple of a resulting $\Delta t_i$ that exactly covers the full sample, then the first analyzed interval at the start of the full sample is extended accordingly. The exact $\Delta t_i$ values to be inserted in eqs. (23) and (24) are the results of eq. (18).

TABLE 1

| $\Delta t_i$ | 594 | 297 | 148 | 74 | 37 | 18 | 7 |
|---|---|---|---|---|---|---|---|
| $w_i$ | 0.086 | 0.139 | 0.212 | 0.234 | 0.171 | 0.104 | 0.056 |
| $\sigma_i$ | 21.92% | 11.80% | 7.81% | 5.37% | 3.64% | 2.41% | 1.47% |
| $\overline{X}_{\Delta t_i}$ | 36.83% | 18.42% | 9.21% | 4.60% | 2.30% | 1.12% | 0.43% |
| $X_{\textit{eff},ann,\Delta t_i}$ | 7.88% | 14.09% | 15.15% | 15.56% | 16.12% | 16.75% | 16.99% |

Typical results for the performance measure according to each horizon. The horizons $\Delta t_i$ are given in days, the weights are normalized to one.

To illustrate the effective return computation, Table 1 displays typical results for a preferred trading model for the German mark against the U.S. dollar, tested on six and a half years (March 1986 to September 1992) of data. The analyzed horizons $\Delta t_i$, the weights $w_i$, the variances $\sigma_i^2$, the average returns $\overline{X}_{\Delta t_i}$, and the annualized effective returns $X_{\textit{eff},ann,\Delta t_i}$ (see eq. (21)) are presented in Table 1. The average yearly return of this run is $\overline{X}=22.65\%$ and the effective yearly return (computed according to eq. 23 with C=0.10) is $X_{\textit{eff}}=14.91\%$. The yearly return is preferably reduced by a "risk premium" of about a third of the original value.

In order to optimize and test trading models, available historical data is preferably split into three different periods. The first period is used to build up the indicators, the second one is for the optimization of the trading model parameters, and the third for selecting the best trading models. The continuously increasing data set collected from the quote-vendors is reserved for real-time (ex ante) testing.

The build-up period generally contains more than ten years of daily data, which is used to update long-term indicators. A few weeks of tick-by-tick data is also needed to build up short-term indicators. In the disclosed example, the end of that period is 1 Mar. 1986 for the USD/DEM, USD/JPY, GBP/USD and USD/CHF major exchange rates and 1 Dec. 1986 for the USD/NLG, USD/FRF and USD/ITL minor exchange rates.

To optimize the trading model parameters, a three-year in-sample period starting just after the end of the build-up period is used. We assume that three years of tick-by-tick data is sufficient to optimize the trading models. The end of the latter period is 1 Mar. 1989 for the major exchange rates and 1 Dec. 1989 for the minor ones.

The in-sample performance refers to the period for which the model is developed and optimized. Preferably, different formulae for computing the indicators, different trading strategies, and different parameters are tested until the model is found to achieve the optimal return. This process involves thousands of simulation runs. To select the best parameter set, choose the solution in the parameter space that corresponds to the larger effective return. If different solutions with comparable returns are found, choose the solution that is not too sensitive to a small change of the parameter set. In some cases, a period of three years in-sample data is insufficient because some volatility clusters can be as large as the optimization period.

Because extending the available historical tick-by-tick data is not possible, further restrictions are enforced on the choice of possible parameters. A solution is considered only if a similar cluster of good results exists for different FX rates at about the same place in the parameter space. This implies that various parameters must be scaled with the volatility of the individual FX rates in order to make them comparable between different rates.

The result of the in-sample optimization process is a small set of diverse trading models sharing a high effective return. Only these models are analyzed in the out-of-sample performance test. The out-of-sample period covers the remainder of the historical data, from the end of the in-sample period until the end of September 1991. A trading model is considered to be valid if the in-sample and out-of-sample periods yield a similar quality. Otherwise, the model is rejected. To avoid overfitting problems, the out-of-sample results are never used to select between similar models.

Since these models were developed we can now test them on a significant ex ante period. (We term ex ante period a period of time that has never been used in conjunction with model development).

A private investor may use a margin account to invest a multiple of his equity in the market. Such a leverage factor has an overriding impact on the total return. But the higher the leverage the higher too the risk of large draw-downs. Working with a high leverage factor may lead to margin calls during periods of draw-down, thus jeopardizing an investor's trading strategy. We have therefore developed our models without leverage. This should be borne in mind while evaluating the results.

The most important performance measure is the effective return, as defined in eq. (23). While the total return may mask a considerable risk introduced by high volatility of return, the effective return is risk-sensitive: the higher the volatility of return the lower the effective return. In other words, high effective returns indicate highly stable returns.

The maximum draw-down, defined by eq. (6), is also a significant performance indicator for a trading model user. It is the largest loss from a local maximum to a minimum of the total return curve within the test period. The maximum draw-down is a measure of risk, similar to the difference between the total return and the effective return.

Another important performance measure is the profit/loss ratio, defined in eq. (7) to be the ratio between the total number of profitable deals and the total number of losing deals. The preferred models let profits run and cut losses early; they are almost always in an open position, and go neutral only in case of stop-loss or save profit. Such a strategy is bound to result in a lower profit/loss ratio than would be achieved by less active models.

The first quality test of a new trading model is to compare the in-sample and out-of-sample performances. The performances in the two periods must be of nearly equal quality for it to merit further consideration. To receive sufficient statistical information, a model must be tested for an extended out-of-sample period and for many different time series. If the average out-of-sample performance is significantly smaller, it may mean that the model was overfitted. However, a much lower average volatility in the out-of-sample period can explain a reduced performance of the model, in that there are fewer opportunities for profitable trading. The performance difference, however, must not be too large.

Figure 2:
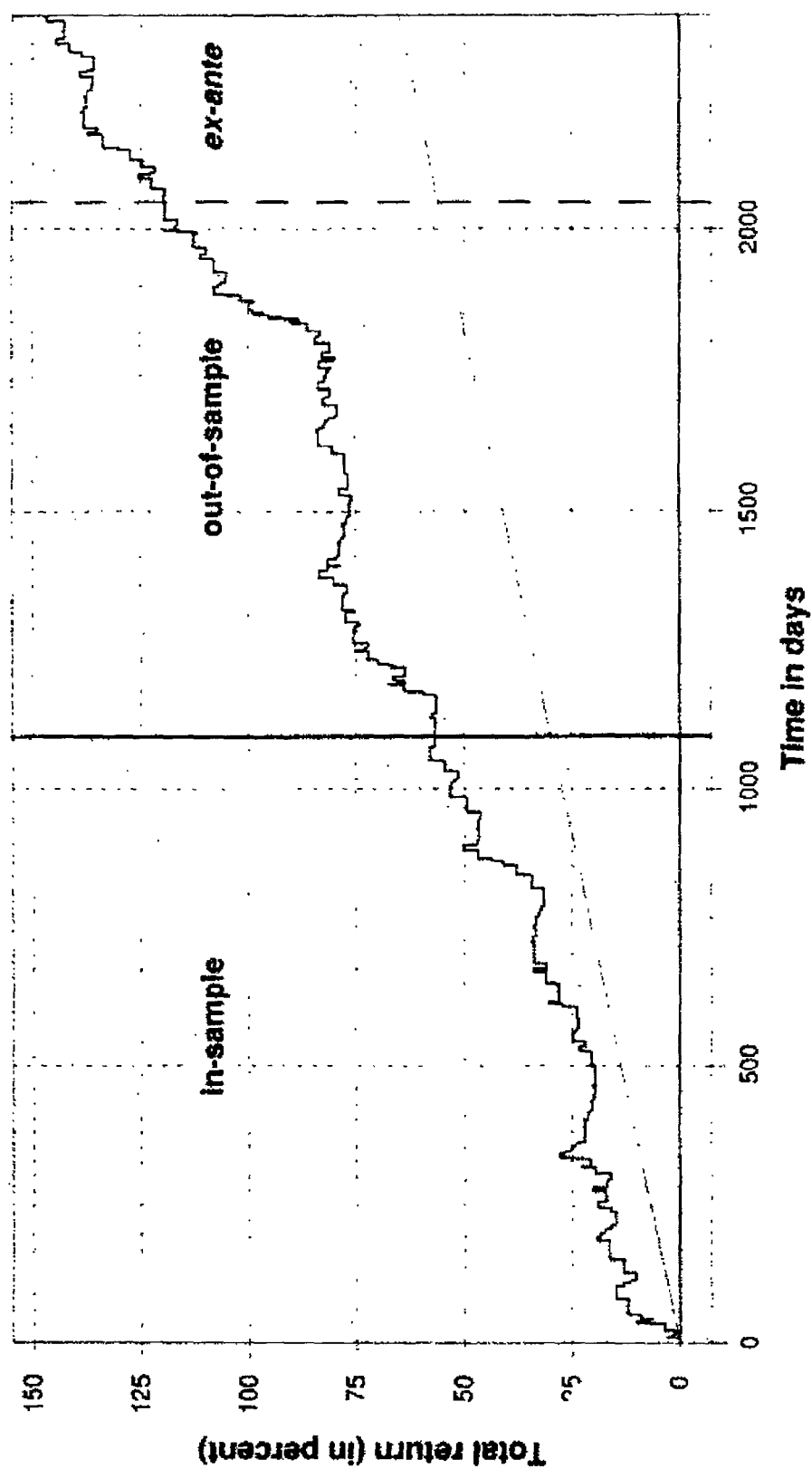
FIG. 2 depicts an example of a total return curve over three periods: in-sample, out-of-sample, and ex ante.

An example of a total return curve over all three periods, in-sample, out-of-sample, and ex ante, is given in FIG. 2. The results of Table 2 (see end of this description) belong to the same example.

Table 2 shows the in-sample period (1.3.86 to 1.3.89 for USD/DEM, USD/JPY, GBP/USD and USD/CHF, and 1.12.86 to 12.3.89 for USD/NLG, USD/FRF and USD/ITL), the out-of-sample period (1.3.89 to 1.10.91 and 1.12.89 to 1.10.91 respectively) and the ex ante period (1.10.91 to 4.9.92). The performance indicators shown are: the annualized return ($\overline{X}$), the risk-sensitive return ($X_{A,\text{eff}}$), the maximum draw-down (D) over the sample, and the ratio of the number of profitable deals to the number of deals that resulted in a loss (P/L).

In Table 2 we compare the in-sample, out-of-sample and ex ante performances of the preferred trading models. We observe that the average values of these quantities are similar to one another. This indicates the overall stability of our trading models and that the achieved profits do not result from model overfitting.

The individual ex ante values do, however, vary. We attribute this variance to the relative short ex ante testing period. The USD/JPY model has also performed less adequately than the others. This is because of the relatively low volatility in USD/JPY trading over the ex ante testing period.

In table 3, the performance of preferred trading models is compared to that of a more conventional 20-day moving-average model. Both models share the same environment; they have the same opening hours, book-keeping rules and so on. They differ in the indicators and the rules on how to use these. The 20-day moving-average model uses the difference between the current logarithmic middle price and a conventional 20-day moving-average as its indicator, rather than eq. (16). In this simple model, the indicator threshold level is not varied and there are no overbought/oversold signals.

The preferred trading models surpass the 20-day moving-average model in all respects: they produce much higher total returns and effective returns and, except for one rate, much lower drawdowns.

When investing in equity, it is common practice to spread the risk over different stocks. The same strategy may also be applied for currency trading. For example, the volatility may suddenly decline in a particular market and it may then not be possible to make any real money in this market for some period of time. We have tested such portfolios with a stable and equal capital distribution among the different models. The results (see Table 4) show clearly that the maximum drawdown and the drawdown period are significantly lower than those of the individual models. In line with portfolio theory, the portfolios with the lowest values (a little above 5% for the maximum drawdown and 22 (21) days for the drawdown period) are the ones comprising the most diversified currencies. At the same time these portfolios generate an impressive annualized return. Compared to the individual models, therefore, a portfolio achieves a more stable return with lower risk.

A second preferred embodiment comprises a trading model, designated herein as Trading Model 60, or TM60, that uses different sub-models, each with its own time horizon, thus modeling the views and actions of different trader groups or market components.

In this second embodiment, preferred software supports general trading model functions such as opening hours, stop-loss and profit objective, and internal model performance bookkeeping including realistic transaction costs. TM60 is a genuine intra-day real-time model that analyzes every tick available from the market to construct its trading signals.

Trading Model 60 is a multi-horizon model. It is using three different sub-models simultaneously, each with its own time horizon. The idea behind this model structure is the hypothesis of a heterogeneous market with trader groups that differ in their views and actions in several respects, most notably in their time horizons. The trading model eventually constructs its recommendation based on the view of all these components together. A preferred TM60 embodiment has three market components; the centers of gravity of the past analyzed by the model indicators are of 1 day, 4 days, and 16 days (measured in σ-time, not just working days, as explained below). The trading model eventually constructs its recommendation based on the view of all these components together.

Each sub-model has its own indicator. The indicator is constructed from the variable x, which is here a very short-term (range: a few seconds) exponential moving average (EMA) of the logarithmic middle price. This very short-term smoothing eliminates a large part of the short-term noise that can be attributed to the different buying/selling intentions of the price quote suppliers.

The indicator I is a "momentum", that is the difference between x and a specially weighted moving average of x:

$$I = x - \text{EMA}_x^{(2,4)}$$

where $\text{EMA}^{(2,4)}$ is computed through the repeated application of the EMA operator, as defined and explained above (see equation (15)). The superiority of the $\text{EMA}^{(2,4)}$ which is neither a plain moving average nor an exponentially weighted one has been established.

The time scale chosen for the EMA computations is σ-time as defined above, in order to prevent the intra-daily seasonality of volatility from negatively affecting the trading behavior. The depth of the past considered in the indicator computation corresponds to the time horizon of the sub-model. A normalized indicator is then computed, that is the indicator I is divided by the square root of its own long-term moving variance.

This normalized indicator is the basis for constructing the sub-model signal. The signal of the sub-model flips its sign when the indicator crosses a break level. The break level is a small positive value for positive (buy) signals and the inverse negative value for negative (sell) signals. The absolute value of the break level is not constant: after each signal flipping, it is raised by a fixed amount, the "break penalty." Afterwards, it is fading with time, until a minimum level is reached. This mechanism ensures a certain adaptivity to market situations: the large number of signal flippings in certain sideways markets is reduced by the raising of the break level.

As the microstructure of a market changes over the long term it is quite possible that the numerical values of the indicators may drift to a lower or higher numerical territory. Because models tend to function on the basis of thresholds, this drift effect can cause models to become overactive or under-active. A preferred method of guarding against this is to normalize the raw indicators over their long-term average and to assign thresholds based on the statistical properties of the indicator distribution instead of absolute values of the raw indicators. For example, a raw indicator might be said to have crossed a threshold when it increases beyond a certain percentile of its long-term distribution. This effect is achieved by normalization.

The sign of the signal is determined by the indicator breaks explained above. The magnitude of the signal is determined by other factors:

Signal freshness: the signal is strong when the indicator just crosses the break level; it is weak when the indicator starts to move back to the opposite side.

Overbought/oversold: the signal is modulated to become weak when the current trend (since the last indicator break) has become exceptionally strong.

Spread correction: if the bid-ask spread is large (non-negligible) as compared to the (non-normalized) indicator RMS value, the signal is weakened; following this signal might lead to too high transaction costs as compared to the profit. This effect favors long-term sub-models over short-term ones.

Market condition: the signal is modulated to be weak when the market is a "noisy" sideways market. This is measured through a ratio of recent volatilities: the volatility of short-term price moves measured on a fine time grid, divided by the volatility of long-term price moves measured on a coarse time grid. A low ratio means a trending market with little noise. Statistical studies have shown that not only volatilities are persistent (clustered), but also their ratios.

The modulation of the signal by these factors leads to a more flexible model behavior and a certain adaptivity to current market states and behaviors. The resulting sub-model signal summarizes the "opinion" of the sub-model or the corresponding market component.

The joint TM60 signal is simply the sum of all sub-model signals. TM60 produces a trading recommendation (e.g., "go long +1.0", "go neutral", "go short –0.5") whenever the joint signal crosses over certain fixed threshold values. If the trading model environment forbids the production of a trading recommendation (e.g., overnight, outside the trading hours), there will be no trading recommendation, even if the level of the joint TM60 signal would imply one.

The stop-loss and stop-profit mechanism of the trading model environment over-rides the trading recommendations of the normal TM60 algorithm. They constitute a "safety net"; normal trading recommendations are much more frequent than those from a stop-loss or stop-profit. The profit objective value (3%) is similar to those of other trading models discussed above. The stop-loss value (1.8%) and especially the moving loss limit (the moving stop-loss after reaching the profit objective, 0.1%) are smaller than those of other models discussed above, leading to faster execution. These values are the same for all FX rates in the TM60.

A perfectly adaptive trading model that would constantly adapt its behavior according to some built-in analysis would be able to adapt to any FX rate, minor or major, EMS or non-EMS, and even to any financial price series. For such a model, no rate-specific model optimization would be needed; all FX rates would share the same, hard-wired parameters.

Trading Model 60 is adaptive to a certain degree but not perfectly. Therefore, it comes in three versions that share the algorithm but differ in some parameters:

1. A version with a high transaction frequency for freely floating rates with high volatility and liquidity and low bid-ask spreads. Typical application: USD/DEM, DEM/JPY.

2. A version with a stronger spread correction and other parameters leading to a lower transaction frequency. Typical application: minor rates and European DEM cross rates such as DEM/SEK.

3. A version with longer horizons of the sub-models (4 days, 15.6 days and 61 days instead of 1 day, 4 days and 16 days), also with low transaction frequency, for all (not too minor) rates against the USD, except USD/DEM. Typical application: AUD/USD, USD/CHF.

Preferably, careful optimization and testing procedures are maintained, so as to minimize the "overfitting" of models to particular rates and time periods. For the same reason, all FX rates have a TM60 parameter choice strictly following one of these three versions, even if it is possible to get a higher historical performance through another parameter fit.

Figure 3:
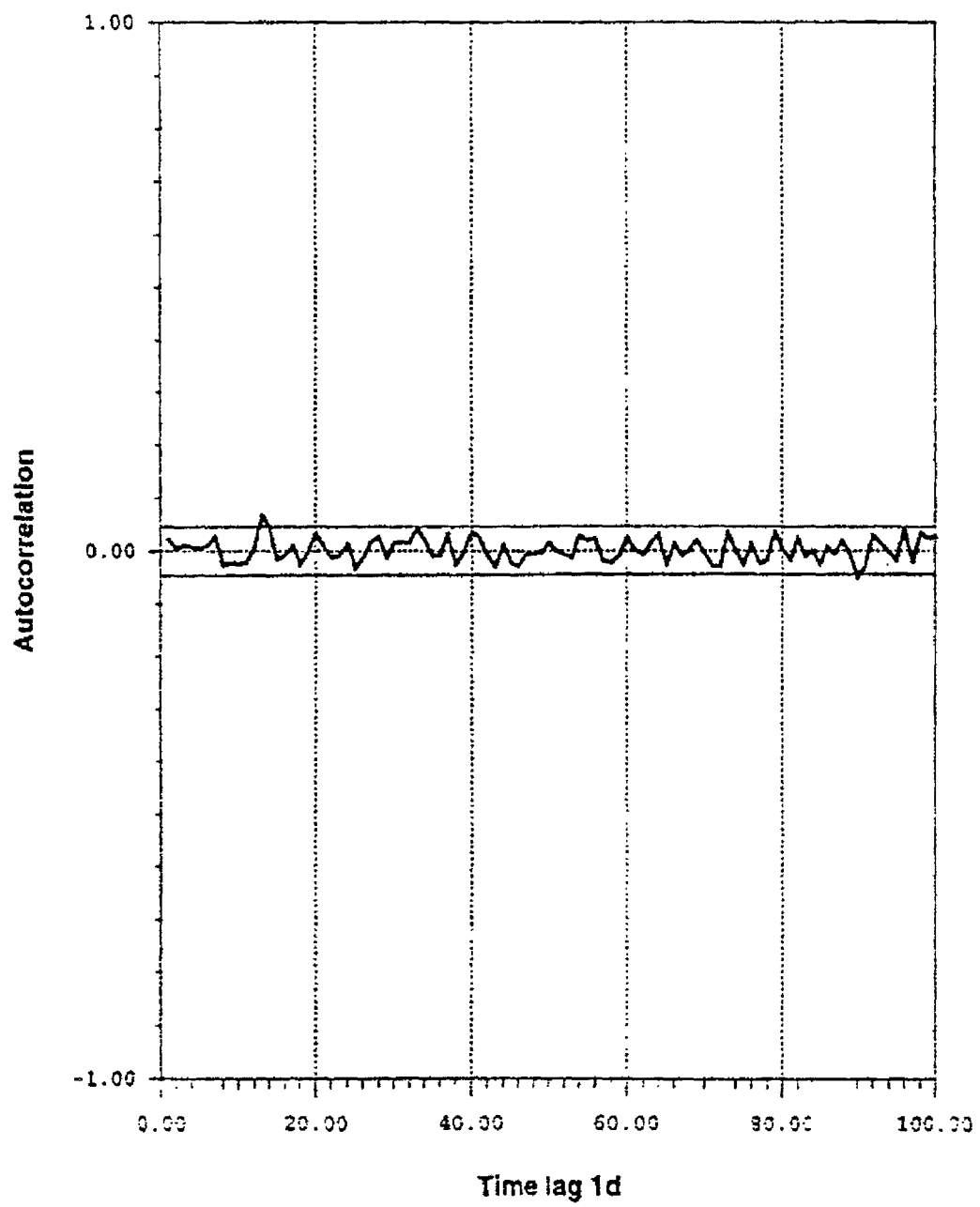
FIG. 3 depicts the USD-DEM autocorrelation function of the price changes (with sign) with lags in units of 1 day in physical time up to a lag of 100 days.

FIG. 3 depicts the USD-DEM autocorrelation function of the price changes (with sign) with lags in units of 1 day in physical time up to a lag of 100 days. The horizontal lines represent the 95% confidence interval of a Gaussian random process. Typical auto-correlation structure for price changes (with sign) for FX rates is shown. Note that the correlation of the price change with sign is well within the significance range. This correlation becomes significant only when analyzed conditional to volatility.

A third preferred embodiment comprises a trading model, designated herein as model 70, that is based on the observation that although serial price changes are known to be completely uncorrelated (see FIG. 3), one can see significant serial correlation if this is examined conditional to volatility. Work in this direction was first presented by Blake LeBaron in his paper LeBaron, B., *Some relations between volatility and serial correlations in stock market returns*, 65 Journal of Business 199 (1992). Model 70 uses triplets, $(vol(M), \delta x_{last}(H), \delta x_{next}(H))$, each triplet being calculated at regular intervals of a basic grid interval t, in physical or σ time. Here $\delta x_{last}$ and $\delta x_{next}$ are price changes (with sign) over some horizon H (measured as an integer multiple of t) and vol is the volatility measured as a mean of the absolute log price change; the mean being taken over the last M (for memory) consecutive observations of log price change over the basic grid interval t.

Figure 4:
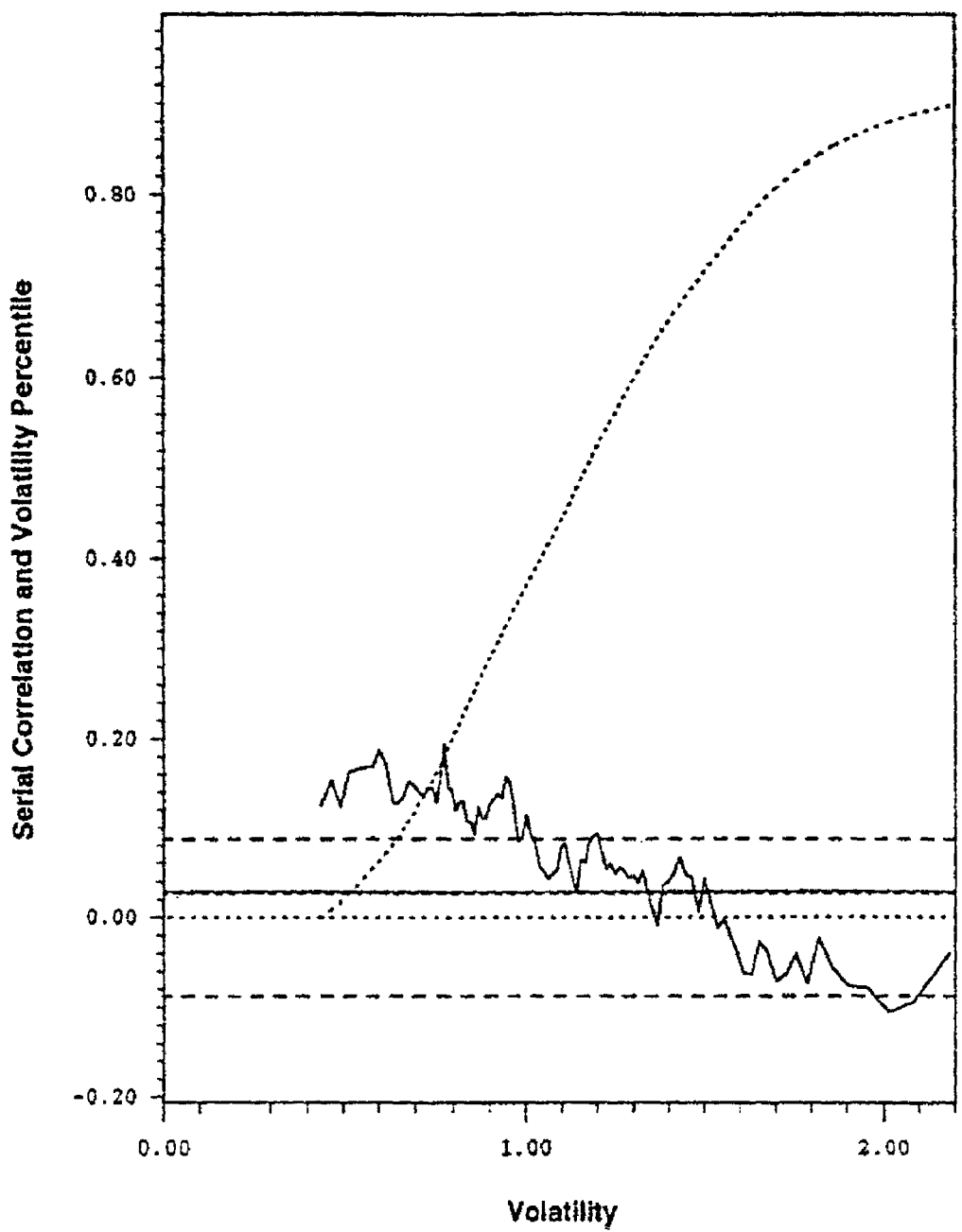
FIG. 4 depicts the USD-DEM serial correlation conditional to volatility.

FIG. 4 depicts the USD-DEM serial correlation conditional to volatility. The volatility is measured as the mean daily price change over 15 days and the correlation (solid curve) is measured between the previous 28 day price change against the future 1 day price change. The corresponding unconditional correlation (horizontal solid line) is positive but barely above its 95% significance level (short-dashed line). The conditional correlation for low volatility is clearly well above its significance level (long-dashed curve) as well as the unconditional correlation. Results are based on daily interpolated prices at 18:00 GMT from 1973 to 1993 (excluding weekends and holidays). Each volatility bin in the analysis was chosen to contain 500 pairs. The dotted curve gives the percentile level of the mean volatility of each bin. Typical conditional correlation seen for FX rates is shown. Note how the conditional correlation is clearly positive at low volatility and negative at high volatility and in both cases higher than the unconditional correlation.

Figure 5:
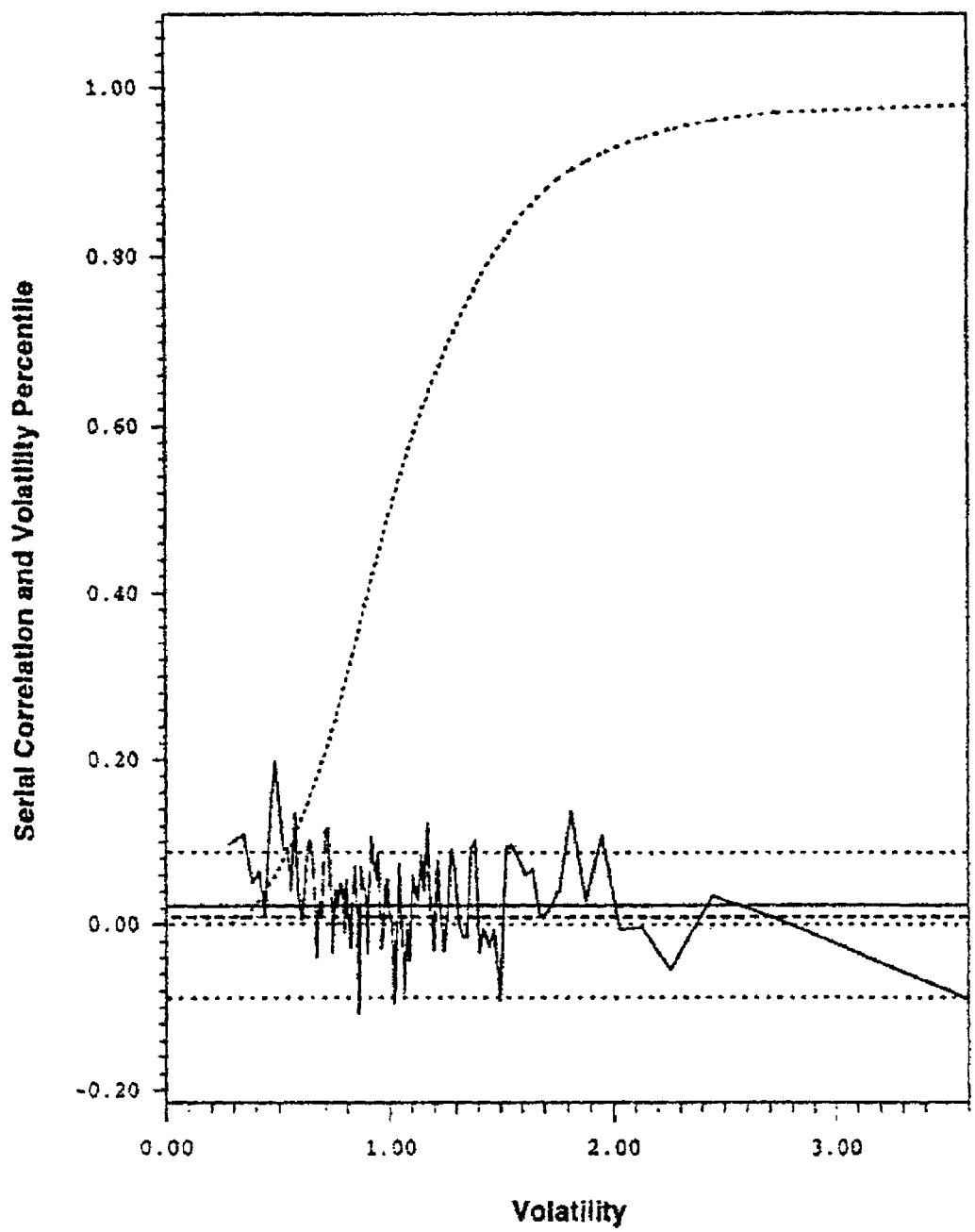
FIG. 5 depicts the intra-day USD-DEM serial correlation conditional to volatility.

FIG. 5 depicts the intra-day USD-DEM serial correlation conditional to volatility. The volatility is measured as the mean over 12 consecutive price changes of 1.5σ hours, and the correlation (solid curve) is measured between the price change over the last 36 σ hours and the price change over the next 1.5σ hours. The corresponding unconditional correlation (horizontal solid line) is barely but significantly positive (compare with the short-dashed line representing the 95% significance level). Results are based on data from 1973 to 1993. Each volatility bin in the analysis was chosen to contain 500 pairs. The dotted curve gives the percentile level of the mean volatility of each bin. Typical conditional intra-day correlation seen for FX rates is shown. Note that the clear signal of a volatility conditional non-linearity as seen in FIG. 4 is absent.

The collection of triplets is then sorted by volatility and the subset of first n price change pairs of the sorted list are then examined for their correlation. This exercise is repeated for every consecutive set of n pairs in the sorted list. As we glide down the list, the mean volatility of the subset of n triplets increases. The relation between the mean volatility of a bin and the corresponding price change correlation is shown graphically in FIG. 4. The main message of FIG. 4 is that there is significant positive correlation in serial price changes in the low volatility regime, and marginal anti-correlation in the extreme high volatility regime.

Note that FIG. 4 corresponds to a series with a basic grid interval of 24 hours in business time (skipping weekends and holidays). Such a series is characterized by a specific hour of the day at which the price changes are reported (the price change being with respect to the same hour the previous working day). FIG. 5 shows the corresponding analysis for a basic grid interval of 1.5 hours in $\sigma$ time. Such a series is not characterized by any specific hour of the day. One postulate for the poor signal in FIG. 5 is that market microstructure changes with the proportion of traders of different horizons. Every time one of the three international markets (America, Asia and Europe) opens, it brings its own mix of trading profiles (particularly trading horizons), and every time it leaves, it depletes the market correspondingly. This effect can significantly distort the volatility definition used for sorting the triplets. Volatilities which may be regarded as low under certain market mixes may be numerically high when compared to other mixes of traders. Neighboring entries in the sorted data therefore will not uniformly correspond to equivalent market conditions with regard to volatility and this will destroy the signal. On the other hand FIG. 4, based on a series characterized by a specific hour of the day, always refers to a price change corresponding to one complete cycle of microstructure fluctuations.

The results above indicate the existence of a lucrative non-linear signal that may be exploited by trading models. The statistical research could have been continued in its pure form and refined in many ways. In particular, investigations could have been extended to search a function space of volatility definitions that would most accentuate the effect. An even more ambitious front would have been to find volatility definitions corrected for intra-day microstructure fluctuations so that the effect (now missing in FIG. 5) would also begin to show in the intra-day regime.

FIG. 4 implies that there is a trend in the low-volatility regime and a direction change in the extreme high-volatility regime. This motivates the creation of 2 kinds of trading models, one with a trend-following strategy and one with a contrarian strategy. From the statistical investigation we know that, for the best effect, the models must be based on a basic grid size of 24 hours of business time (and therefore characterized by a specific hour of the day, as is FIG. 4). Such models will necessarily suffer from one bad side effect: they would not be truly high-frequency data models and would therefore give trading recommendations at the same hour of each day.

The "trading model incarnation" of the effect captured in FIG. 4 is to have a model with the following attributes:

1. A volatility V(M), measured as the mean daily price change over M (memory) days. (Normalized by the scaling law price change for 1 day).

2. A direction D(H), measured by the price change (with sign) over H (horizon) days. (Normalized by the scaling law price change over H days).

3. A volatility threshold value v, below which a volatility is regarded as low in a trend-following model and above which volatility is regarded as high in the contrarian model.

4. A direction threshold value d, which the absolute value of the direction measure must exceed in order to regard the sign of the direction measure as a solid indicator of direction.

Figure 6:
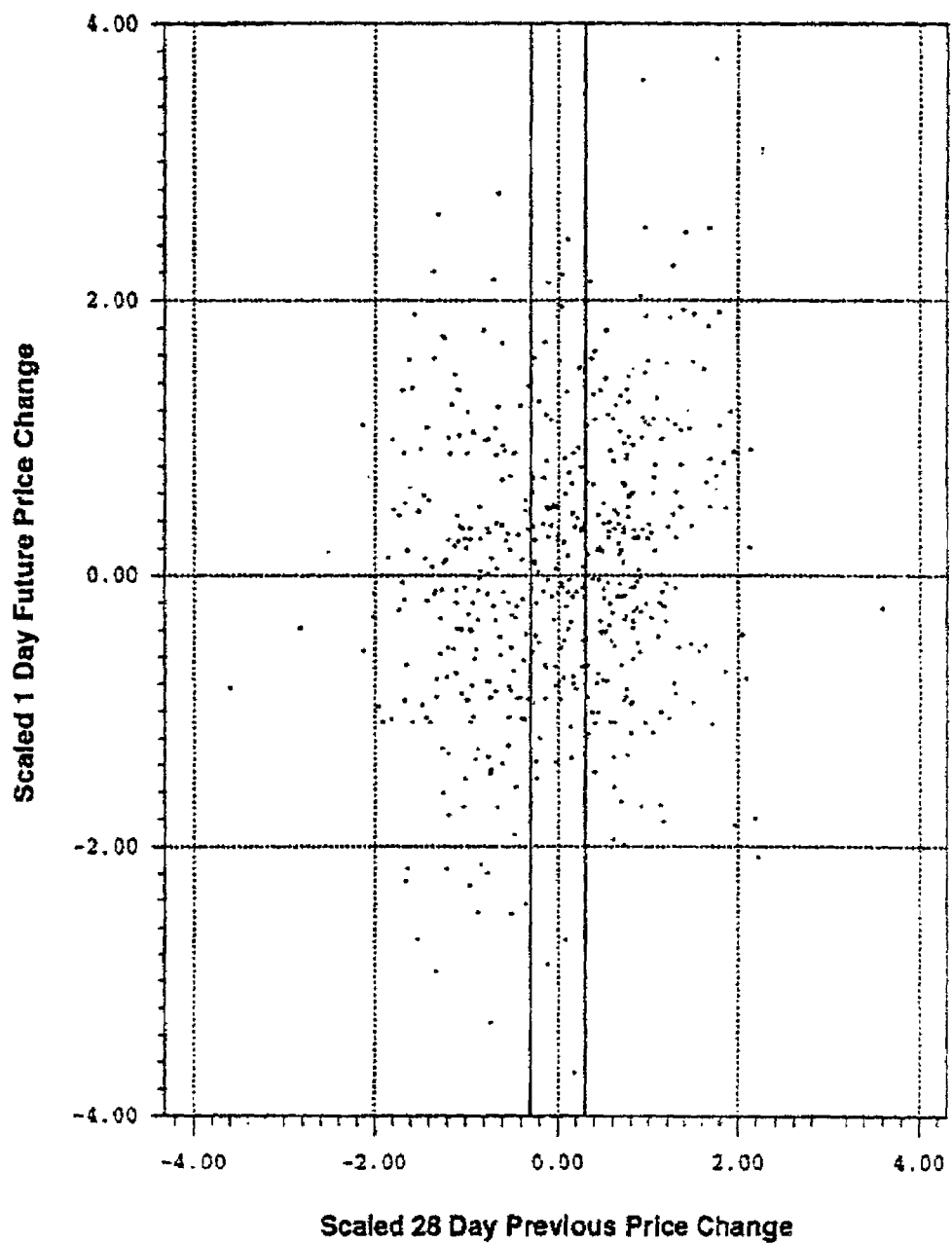
FIG. 6 depicts a scatter plot of $\delta x_{last}$ along the x-axis against $\delta x_{next}$ along the y-axis for the bin corresponding to the maximum positive correlation in FIG. 4.

FIG. 6 is a scatter plot of $\delta x_{last}$ along the x-axis against $\delta x_{next}$ along the y-axis for the bin corresponding to the maximum positive correlation in FIG. 4. It is clear that the distribution of points is biased in favor of the odd quadrants (as a positively correlated set with null mean should). Note however that this effect can be drastically accentuated if the points within the vertical lines are ignored. Item 4 above is motivated by this observation.

Referring to FIG. 6, as expected for a positively-correlated set of numeric pairs, the scatter is biased toward the odd quadrants. The bias can be accentuated by further eliminating data within the vertical lines. Model 70 exploits this effect through its parameter d, which represents the width between the vertical lines.

The trend-following model must have V(M)<υ, and the contrarian model must have V(M)>υ in order to take a position. In addition, both models must satisfy the condition |ID (H)|>d (in keeping with item 4 in the list above) to take a position. The position taken is the same as the sign of D(H) for the trend-following model and opposite to the sign of D(H) for the contrarian model (where + is long and − is short).

The simple structure of the model makes it an ideal tool for investigating market components in terms of memory M and more significantly the horizon H. The actual parameter space investigated for these models is as follows:

1. Volatility Memory M ranging from 1 to 30 days (30 values).
2. Direction Horizon H ranging from 1 to 30 days (30 values).
3. Volatility Threshold υ ranging from 0.1 to 3 times the 1 day scaling law in steps of 0.1 (30 values).
4. Direction threshold d ranging from 0 to 1.0 times the H day scaling law in steps of 0.1 (11 values).
5. The total parameter space contains 297000 points.

As already mentioned, the models are investigated with a 24-hour business time series characterized by data at a specific hour of the day. There could, however, be subtle but significant volatility differences in series that measure price differences from open-to-open as compared to price differences from noon-to-noon. By introducing one additional parameter, the time of day corresponding to the series studied, we can use the trading model to study the evolution of the most relevant horizons through the day. Aside from the latter academic aspect, such a study is also motivated by the temporal delocalization issue to be addressed below. The additional parameter, referred to as update-hour, takes values from 0 to 23 in increments of 1 (24 values), and represents the hour of the day characterizing the series studied. A complete database of results for a given currency pair would therefore contain approximately 297,000×24×2=14 million results—approximately 7 million each for the trend-following and contrarian models. With such a large database of results for each currency, there is an extreme risk of over-fitting. The description below presents procedures developed to reduce this risk and also shows evidence that the procedures work as expected.

"Temporal delocalization" refers to the problem that any single model as just described, corresponding to a certain update hour, will only give a recommendation once in 24 hours. The problem is to be able to use the relatively clean information content in the daily business time series, but at the same time to have a final model that is flexible enough to take action at any hour of the day. The solution to this problem is to regard the models at different hours to be simply sub-models that are ingredients of a final model, which we shall refer to hereafter as the grand model. The grand model is thus a portfolio of models that are each updated individually by the daily business time series corresponding to every hour of the day. The grand model then acts at any hour, on the hour, based on some voting scheme applied to the most recently updated sub-models within the past T ($0 \leq T \leq 23$) hours. For example, if $p_h$ (+1, 0 or −1) represents the recommended position of the sub-model updated at hour h then the grand model gets into a long or short position at hour h if $$P_h \equiv \sum_{i=1}^{T} p_{h-i+1}$$

is such that $|P_h| > S_{in}$, with the position being long if the sum is positive and short if negative. The model gets out of this position and becomes neutral if $|P_h| \leq S_{out}$. Of course we must have the strength parameters $S_{in}$ and $S_{out}$ (thresholds determined during voting rule optimization) such that $S_{in} \geq S_{out}$, $0 \leq S_{in} < T$, $0 \leq S_{out} < T$. (Note that if $S_{in} \geq T$, the grand model will never take a position). Some other variations are described below.

Note that the input sub-models have to be optimized for update hours at every hour of the day, including hours when the market may actually be closed. During optimization of the sub-models, the environment must be specially modified so that deals can be executed even during closed market hours. In the grand model, deals will never be executed when the market is closed (barring stop losses) but the positions of the models corresponding to the hours when the market is closed will be held in memory since, as seen in the above equations, the grand model uses the sum of sub-model recommendations as an indicator.

In addition to the above strategy, which achieves temporal delocalization up to a one hour grid (besides also increasing robustness as a welcome side effect, by pooling the recommendations of multiple models), there is an additional strategy for further delocalization to the continuous time level. This is achieved by a deal delay mechanism that works in a way similar to the moving stop loss. The deal delay mechanism will prevent the immediate execution of a deal on the recommendation of the grand model. Instead, the grand model will be forced to wait until a better price for the deal becomes available. The wait will continue until a price is obtained that is worse than the best price so far (bid or ask depending on the recommended position) by a configurable ratio referred to as the max-loss (say 0.1%). On some occasions this will be a price worse than the price that would have been obtained if the deal was executed immediately; but the gamble is that on most occasions it will be a better price. This algorithm is configured to work only during open hours when deals are possible and only for a duration of 1 hour between sub-model updates. After a sub-model update (on the hour) the deal-delay mechanism is reset based on the latest grand model recommendation.

The contrarian and the trend-following models are preferably used together. The same algorithm that allows for the pooled opinions of the models at different times of the day can be extended to include the "vote" of multiple models updated at the same hour. Thus a grand model can be used that has not just 24 models but 48 models with 2 synchronous sub-model recommendations (one trend-following and one contrarian) at every hour. It is expected that by and large one of these will be neutral when the other is in a long or short position. Thus, the 2 models complement each other.

As already described, during optimization of sub-models a database is preferably generated (with perhaps 14 million results) for a given exchange rate. To conserve disk space, preferably only those results are entered in the database that correspond to a positive-definite value of $X_{eff}$. Each result consists of a single line that, besides specifying the parameters, also specifies the $X_{eff}$, the neutral fraction n (as a percentage of the in-sample during which the model was neutral), and the mean annual return of the model. Due to this large database, it is not a straightforward process to select the best or set of best sub-models that would constitute the grand model. In fact, the selection procedure must itself be an algorithm that produces a final candidate for testing in the out-of-sample. This is described below, after we introduce a new performance measure, the effective-$X_{eff}$.

The effective-$X_{eff}$, or fxf[v], is defined by:

$$fxf[v] = \begin{cases} \dfrac{X_{eff}}{1 - \dfrac{n}{100}} & \text{if } n < v \\ 0 & \text{otherwise} \end{cases}$$

The measure fxf[v] has the advantage of evaluating the performance of the model in relation to the amount of time it is exposed to risk. This is a preferred measure in view of the final usage of this (daily) model only as a component in the grand model. The goal is to find a set of sub-models that are individually conservative and act selectively (having large neutral fractions), but when placed together in the grand model complement each other, causing the grand model to have a much lower neutral fraction. The cutoff v is necessary so that models with very large neutral fractions (due to very few trades) would not be rated as very high simply on the basis of a few trades, since this would not be statistically robust.

Effective-$X_{eff}$ is preferable to $X_{eff}$ cases where models are largely neutral but under specific market conditions make money. Because such models are lartely neutral, their absolute return can be lower than that of models that are more often in position. The effective-$X_{eff}$ scales the $X_{eff}$ measure with respect to the amount of time it actually was in position. Through the effective-$X_{eff}$ measure models with drastically different neutral fractions become incomparable.

There are many schemes one could use to transfer the database of results for a given currency (up to 14 million results) into a single grand model. A straightforward scheme is to construct a grand model by choosing the best trend-following and best contrarian model at every hour, based on some performance measure such as $X_{eff}$ or fxf[50]. A more robust selection scheme would be to use as the best model at hour h the model that has the highest mean value of a performance measure (e.g., $X_{eff}$ or fxf[50]) over some of the neighboring hours around h. Such a selection scheme is characterized by a distance d in hours over which the mean should be taken. If the index i represents a specific set of the 4 principle parameters of the model and j represents the update hour of the model with parameters i, then the performance measure of this model may be denoted as $\chi_{ij}$. With the latter definition and parameter d we can determine a parameter set i at hour h for which $\overline{\chi}_{ih}$, defined by $$\overline{\chi}_{ih} = \begin{cases} \sum_{j=h-d}^{h+d} \chi_{ij} & \text{if } \chi_{ij} > 0 \forall j \\ 0 & \text{otherwise} \end{cases}$$

is maximum. Note that the effect of this scheme as d increases is to prevent rapid variation of sub-models over consecutive hours. The seasonality of the market is in effect at cross purposes to this scheme, so a compromise must be made so that sufficient intra-day market seasonality is captured while robustness of the choice of sub-models is increased.

It is convenient at this stage to formalize the selection schemes by referring to them as $\Theta = \Theta(\chi, d)$, where $\chi$ is the choice of performance measure and d is the distance parameter. A preferred embodiment uses 16 selection schemes as possible candidates for choosing the final model. These are: $\Theta(X_{eff}, d)$ and $\Theta(fxf[v], d)$ for $d \in \{0, 1, 2, 3\}$ and $v \in \{25, 50, 75\}$. These selection schemes are to be separately applied to each database (of 7 million results) for the trend-following and contrarian models for a given currency. The result of each of the (automated) selection schemes is a set of (up to 24) sub-models, denoted by S(rate, strategy, $\chi$, d), when the scheme $\Theta(\chi, d)$ is applied to the currency "rate" and to a model of specific strategy (trend-following or contrarian). The (up to 24) sub-models in a given set each correspond to the recommended components, based on the selection scheme used, for each hour of the day in the grand model. (Note that 24 models may not be obtained in all cases, since the selection algorithm might not find a sub-model that has a positive $\chi_{ij}$ in all neighbouring hours over which $\overline{\chi}_{ih}$ is computed).

In general the grand model can be constructed from these sets as the union

S(rate, trend-following, $\chi_1$, $d_1$) $\cup$ S(rate, contrarian, $\chi_2$, $d_2$).

Note the subscripts on $\chi$ and d. Since we have 16 choices of the pairs $\{\chi, d\}$, there could be 256 choices of the grand model. To limit this number we define:

S(rate, mix, $\chi$, d)=S(rate, trend-following, $\chi$, d) $\cup$ S(rate, contrarian, $\chi$, d)

as the grand model comprising up to 1 trend-following and 1 contrarian model at every hour, obtained by using the same selection scheme $\Theta(\chi, d)$ for choosing the trend-following and contrarian sub-models.

Preferred voting schemes are now described. A scheme based on the sum of sub-model recommendations was mentioned above. The recommendations of all, say N, models within the last T hours are summed. If the current position is neutral, then the grand model recommends a long (+) or short (−) position same as the sign of the sum, provided that the ratio of the sum to N exceeds $S_{in}$. If the model is already in a position (not neutral), then the model becomes neutral if the above ratio falls to $S_{out}$ or less. The motivation for $S_{out}$ to be distinct from (and less than) $S_{in}$ is to inhibit the grand model from changing position rapidly. The smaller $S_{out}$ is from $S_{in}$ the more difficult is the return to neutral after taking a position. If the successive sub-models (every hour) are not too different in their parameters this would be automatic, because the sub-model at the next hour is then more likely to have the same recommendation as the current one. Thus the choice of $S_{in}$ is far more crucial than the choice of $S_{out}$. The logical move is to first study the case $S_{in} = S_{out}$ for various values and then finally set $S_{out}$ marginally lower that $S_{in}$. We shall refer to this voting scheme as scheme 1.

Another voting scheme is to allow ½ gearing. It is similar to the above scheme except that the ratio of the sum of model recommendations of all N models in the past T hours to the total number of models is taken literally as the gearing. $S_{in}$ and $S_{out}$ are still used as before. If the position is currently neutral and the ratio exceeds $S_{in}$, the environment will set the gearing to ½, −½, 1 or −1 depending on which of the these values is closest to the ratio. We refer to this as voting scheme 2.

The above two methods are fully democratic among the quorum of sub-models and make no distinction between trend-following and contrarian models. A third, layering, scheme is different in that it introduces a hierarchy among the synchronous models. As mentioned above, the final grand model will preferably have one trend-following and one contrarian model acting synchronously at every hour. These models are largely likely to be uncorrelated by construction since one (the trend-following) takes a position when the volatility is below a certain threshold, and the other (the contrarian) takes a position when it is above a certain threshold. Nevertheless, because of differences in volatility memory between the two models, it is occasionally possible for them to act simultaneously. A layering scheme introduces a hierarchy whereby the non-neutral recommendation of the trend-following sub-model can have a veto-like effect, overruling the recommendation of the synchronous contrarian sub-model, or vice versa. In other words, the subordinate sub-model can only act if the one with precedence is neutral. If, as stated, the trend-following sub-model has precedence, this scheme is referred to as voting scheme 3t, and if the contrarian sub-model has precedence, it is referred to as scheme 3c.

We now describe a preferred optimization strategy for this embodiment (model 70). We choose the in-sample region to be alternating bands of 546 days from 01.01.87 onwards. This gives us 3 bands for optimization. The preferred strategy for optimization of model 70 is to first create a database of solutions for the trend-following and contrarian models (for all hours of the day for a given currency) using only the first two in-sample bands.

The database is then searched by the 16 candidate selection procedures to arrive at the set of sub-models S(rate, trend-following, $\chi_i$, $d_j$) and S(rate, contrarian, $\chi_i$, $d_j$), where $i \in [1,4]$ and $j \in [0-3]$, and where $d_j=j$, $\chi_1=$xeff, $\chi_2=$fxf[25], $\chi_3=$fxf[50], and $\chi_2=$fxf[75]. In addition to the selection of the sub-models, the high-frequency grand model also needs to be specified according to the following 5 high-frequency parameters: (1) the parameter T, which sets the number of hours in the past that play a role in determining the current position; (2) the strength parameter $S_{in}$; (3) the strength parameter $S_{out}$; (4) the voting scheme (1,2,3t and 3c); and (5) the max-loss parameter.

Note that here the selection procedure itself becomes a meta-parameter. The selection procedure (determined by $\chi$ and d) and the above set of 5 parameters shall be referred to as the high-frequency parameters, since they are the parameters that determine how individual sub-models (acting only once daily) are to be converted into a high-frequency grand model with temporal delocalization.

For the same choice of $\chi$ and d, the choice of sub-models can differ between currency rates. For robustness, the strategy is to find $\chi$, d, and the above set of 5 parameters (the set of high-frequency parameters) such that the mean value of the $X_{eff}$ over all currency rates is maximized by their choices in the third in-sample band. Thus, the sub-models are themselves currency-rate-specific, but the high-frequency parameters (including the selection scheme) are common between currency rates. It is reasonable to expect that the degree of overfitting is diminished by (1) a judicious choice of high-frequency parameters; (2) by optimizing them in an in-sample band that has never been exposed to the ingredient sub-models; and (3) choosing these to be globally uniform over all exchange rates. It cannot be over-emphasized that the sub-models are chosen by the selection schemes based only on their individual performance in the first two in-sample bands. There is preferably no optimization to pick the models so that they work well together. (Such a scheme would be drastically prone to overfitting).

Preferably, individual sub-models are optimized on a first in-sample band, and the grand model parameters (including voting scheme) are optimized on a second in-sample band. This allows the grand model parameters, which govern how all of the sub-model recommendations will be used to arrive at a final trading signal, to be optimized on a band that is out-of-sample for the sub-models. This in turn allows the grand model parameters to be optimized in a manner that "buys insurance" against possible over-fitting of the sub-models on their in-sample.

There is one complication that must be discussed. The optimal selection procedure for the trend-following models may not be the same as the one that works best for the contrarian models. Thus the above strategy must be applied to separately construct purely trend-following and purely contrarian high-frequency models. The $X_{eff}$ for these are then separately averaged over currency rates (in the third in-sample band) to determine the best choice of selection procedure for the trend-following sub-models and the possibly distinct best choice for the contrarian models. These two selection procedures are then applied to construct the mixed model, and re-optimized in the third in-sample band to determine the remaining 5 high frequency parameters enumerated above—again by averaging the performance over different exchange rates as usual. We shall refer to models constructed by this procedure as hybrid models.

In addition to the strategy of the last paragraph, we can also test the effect of choosing the set S(rate, mix, $\chi$, d), defined earlier, although it does not allow separate selection procedures for the trend-following and contrarian models. We shall refer to models constructed by this procedure as mixed models.

A database of results for the USD-DEM, USD-JPY and GBP-USD has been completed for the trend-following as well as contrarian models. The results presented below reflect tests in the third in-sample band but by limiting 3 of the 5 high frequency parameters enumerated above in the following way:

1. T is fixed (T=23). This is a common-sense choice since it seems reasonable that the more sub-models used to pool their opinions, the better the model must behave. Some test runs allowing this parameter to vary have confirmed that this is reasonable, although the strictly best models seemed to be clustered around T=20.
2. $S_{out}$ is fixed ($S_{out}=S_{in}$). Again a common-sense choice. It is expected that performance should marginally improve if $S_{out}$ is marginally less than $S_{in}$, but the more critical value is definitely $S_{in}$.
3. The parameter max-loss is fixed (max-loss=0). This essentially disables the deal delay mechanism. The max-loss is the least critical of the parameter set. The value can be set as the last step of the optimization process.

All of the above parameters are preferably allowed to vary at a later stage of the optimization process. The first step is to identify the best choice of selection procedure and the $S_{in}$ parameter. The results presented below, for the 3 databases ready so far (USD-DEM, USD-JPY and GBP-USD), are with the above-enumerated parameter-space limitations.

Table 5 evolves as optimization proceeds over more rates. If the displayed state of Table 1 (having studied only 3 rates) is any indication of its future evolution, it seems reasonable to expect that the best selection procedure for the trend-following sub-models will differ from that for the contrarian sub-models. The mixed model results in Table 5 are for the case where both the trend-following and contrarian models are selected by the same scheme $\Theta(\chi, d)$. After the databases for many more currencies are prepared, one final step is preferably to test a mixed model constructed, not with the same selection scheme for the two strategies, but with the different and optimal selection schemes for the two strategies.

Also note in Table 5 that the strength parameter for the mixed model is lower than that for the single strategy models. This is to be expected since the synchronous trend-following and contrarian sub-models are unlikely to sum to a value greater than 1 (by design, as discussed earlier). Thus the sum of sub-model positions will on an average not change much (compared to the single strategy models), but the total number of models is doubled, thus requiring the strength $S_{in}$ to be reduced. For this reason, the parameter $S_{in}$ for the purely trend-following and purely contrarian models is varied from 0.0 to 0.6, in steps of 0.1, but the same parameter for the hybrid and mixed models is varied from 0.0 to 3.0, in steps of 0.05.

As mentioned above, the selection scheme must strike a balance between allowing intra-day seasonality (by not taking d very high) and robustness (by not taking d very low). Tables 6 and 7 show the evolution of the horizon H (in days), which is the most critical of the 4 sub-model parameters, for each exchange rate, using the best selection scheme for the purely trend-following and purely contrarian grand models as determined by the current status of Table 5.

The rather gradual variation of the horizons from hour to hour and the fact that only a few relevant horizons stand out in Tables 6 and 7 provide testimony to the reasonableness of the selection schemes and their ability to thwart over-fitting.

In the final round, a new database of results must be constructed for each currency rate, wherein the sub-models are exposed to all three in-sample bands. Then the candidate model for the real out-of-sample test, for each currency rate, is the model constructed with these more robust sub-models (by virtue of being exposed to a larger in-sample) by applying the selection procedure and high-frequency parameters gleaned from the tests and criteria in the third in-sample band discussed above.

A fourth preferred embodiment comprises customized trading models. The basic motivation for the trading model of this embodiment, referred to herein as a customized trading model, is that the FX and other markets can change their nature and behavior over the years. The performance of trading models can vary with different market states. Financial markets are known to exhibit distinct and persistent patterns and certain clusters of behavior. In 1995 and 1996, for example, FX markets were characterized by sideways movements with few large trends, while volatility was still high when measured at high resolution. Institutional changes, such as the development of the European Monetary System, can also cause behavior shifts. These changes can affect the performance of a trading model (TM) optimized during periods with particular behavior (e.g., large trends). Thus, a preferred embodiment comprises trading models with a variety of different strategies, according to different market states indicated by volatilities of different time horizons and other nonlinear indicators related to volatility.

This embodiment preferably uses indicators that observe and predict the characteristics of the market. Different strategies for different types of markets are then followed. In other words, specifically designed market state indicators, functions of the present state of the market, are used that help a model to adapt its strategy to the market situation. These adaptive strategies account particularly for the situation of sideways markets, where some other trading models underperform significantly. In sideways markets, short-term noise, rather than large movements, dominates. If a trend-following model is applied, this leads to frequent loss-making transactions. Detecting these states and adjusting the strategy correspondingly can avoid this. Adaptivity of the model refers also to structural breaks of the market, where old market states are disrupted. In this case, the model should react quickly and "forget" about the old market state.

To address these problems, a preferred embodiment implements different sub-models with individual time horizons, thus modeling the views and actions of different trader groups or market components. These different components range from intra-day horizons to time horizons of about one month.

Preferably, from a user's perspective, this trading model (TM) is seen as just another real-time trading model. With respect to the other embodiments described above, there are no additional architectural or functional requirements for the customizations.

Whereas previously-described TMs and the instant customized trading model can be operated in the same technical way, they differ in other respects: the so-called customizations. Some aspects, such as the choice of the active day-times of the model, are discussed only briefly below, since they are common to the general trading model architecture described above. The most important customization is described in detail below.

The trading model architecture is preferably constructed using C++. It has very similar features and properties as the trading model technology described above with respect to the other preferred embodiments. FIG. 1 provides a graphic illustration of this structure.

As in other preferred embodiments, the gearing calculator constitutes the heart of the instant trading model and supplies its characteristic features. The model-specific indicators and a raw gearing of the model are calculated. The result is then processed in the other parts of the architecture. The expression "gearing" refers to the direction and size of the position taken in the market; a negative gearing means a short position.

Financial markets are known to be constituted of different types of traders whose behaviors differ in several respects: the markets are heterogeneous. The most important difference between market components is related to the time horizon: short-term traders observe and cause minute-by-minute price movements, whereas some long-term investors rebalance their positions only in weeks or months.

A trading model algorithm based on a deep understanding of market mechanisms should account for this heterogeneity. An efficient way of dealing with heterogeneity is through the construction of different sub-models, where each of these has its own time horizon. Each sub-model incorporates the view and the actions of one trader group in its analysis and arrives at its own trading recommendations. These recommendations are then weighted together in order to obtain the overall model gearing.

Each sub-model of a preferred embodiment has the same structure, and most parameters are identical among different sub-models (some of them are simple power law functions of the time horizon). This is algorithmically advantageous and makes the optimization process easier and more resistant against overfitting than letting all parameters be optimized independently. The essential parameter of an individual sub-model is, of course, its time horizon.

The algorithm used for the customized trading model has some less specific elements that are described above with respect to other embodiments, such as the price filter, the stop-loss detector, the opportunity catcher (picking a realistic execution price), and others. These elements are adopted by the customized trading model, with an appropriate choice of (optimized) parameters.

Price filtering (checking incoming quotes from the data suppliers for outliers) is necessary to avoid trading signals that result from misquoted prices. A description of a basic approach to filtering is given in Dacorogna, M. M., Müller, U. A., Nagler, R. J., Olsen, R. B., and Pictet, O. V., *A geographical model for the daily and weekly seasonal volatility in the FX market,* 12 Journal of International Money and Finance 413 (1993) (hereinafter Dacorogna 1993). A preferred price filter is based on that approach.

A stop loss detector triggers if the market moves in disfavor of the taken position by passing the stop-loss price, and causes a deal to enter a neutral position. This can happen also overnight, when markets are closed. Overnight stop-loss transactions can be executed by a trader located in another time zone.

A special case is profit taking. A stop price is set as soon as a profit objective is reached. This stop price is moving in parallel with the level of the best price achieved so far during the open periods of the market.

The deal acceptor validates the recommendations of the gearing calculator using the following rules: (1) no deal is allowed to take place within fifteen minutes of another deal having occurred; (2) a deal filter (even more stringent than the normal quote filter) determines if a given price is suitable for trading; and (3) trading can only take place during the open hours of the specific market of the model (except for stop-loss trading, which is supported around the clock).

An opportunity catcher searches for a realistic price to be taken for the internal book-keeping of the model. This happens in a time window of 2-3 minutes (depending on the currency), where the median of the applicable price quotes (bid or ask) is taken. A signal is sent to a human user before this time window (to tell him to execute the deal) and afterwards (to inform him of the price used for internal book-keeping).

Figure 7:
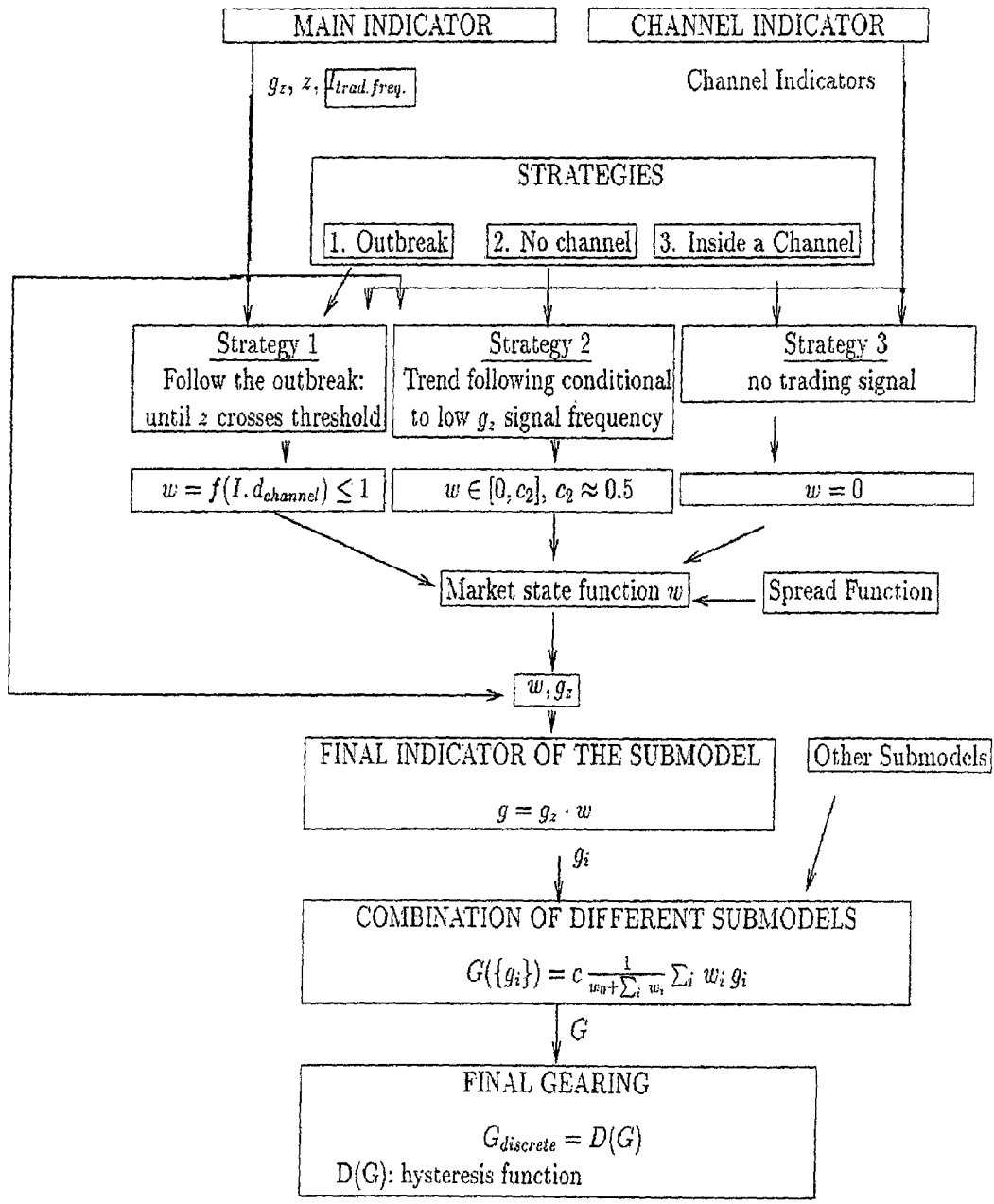
FIG. 7 depicts a preferred structure of a customized trading model: sub-model and main model.

The book-keeper evaluates trading model statistics such as current (unrealized) return, total return, cumulated return, maximum drawdown, and profit-over-loss ratio. FIG. 7 depicts a preferred structure of the customized trading model: sub-model and main model.

The final gearing as well as the trading recommendation and some other useful results are displayed on the screen of a user's computer.

We now describe in detail the structure of a single sub-model, analyzing the dynamics of one specific time horizon. Then we describe the integration of all different sub-models in the main gearing calculator.

A visual idea of the overall structure as proposed here can be obtained from FIG. 7. As indicated in FIG. 7 the combination of different sub-models at the end leads to the final gearing recommendation of the gearing calculator (see also eq. 54).

A sub-model comprises different parts that serve different tasks: generating raw gearings, analyzing the market state, generating strategies depending on raw gearings and market state, and finally giving a recommendation for the trading model position. Within this structure two different market state indicators, a "channel indicator" (which is indicated on the upper right in FIG. 7 and a "frequency indicator" $I_{trad.freq.}$ (defined through the main indicator and boxed underneath in the upper left in FIG. 7) are implemented. The different indicators and strategies for the single sub-models are defined below.

Sub-models can be seen as complete trading models, but the final goal is to combine sub-models of different time horizons into one main model. The different sub-models share the same structure and algorithm, but the time horizons (and some dependent parameters) are different.

Figure 8:
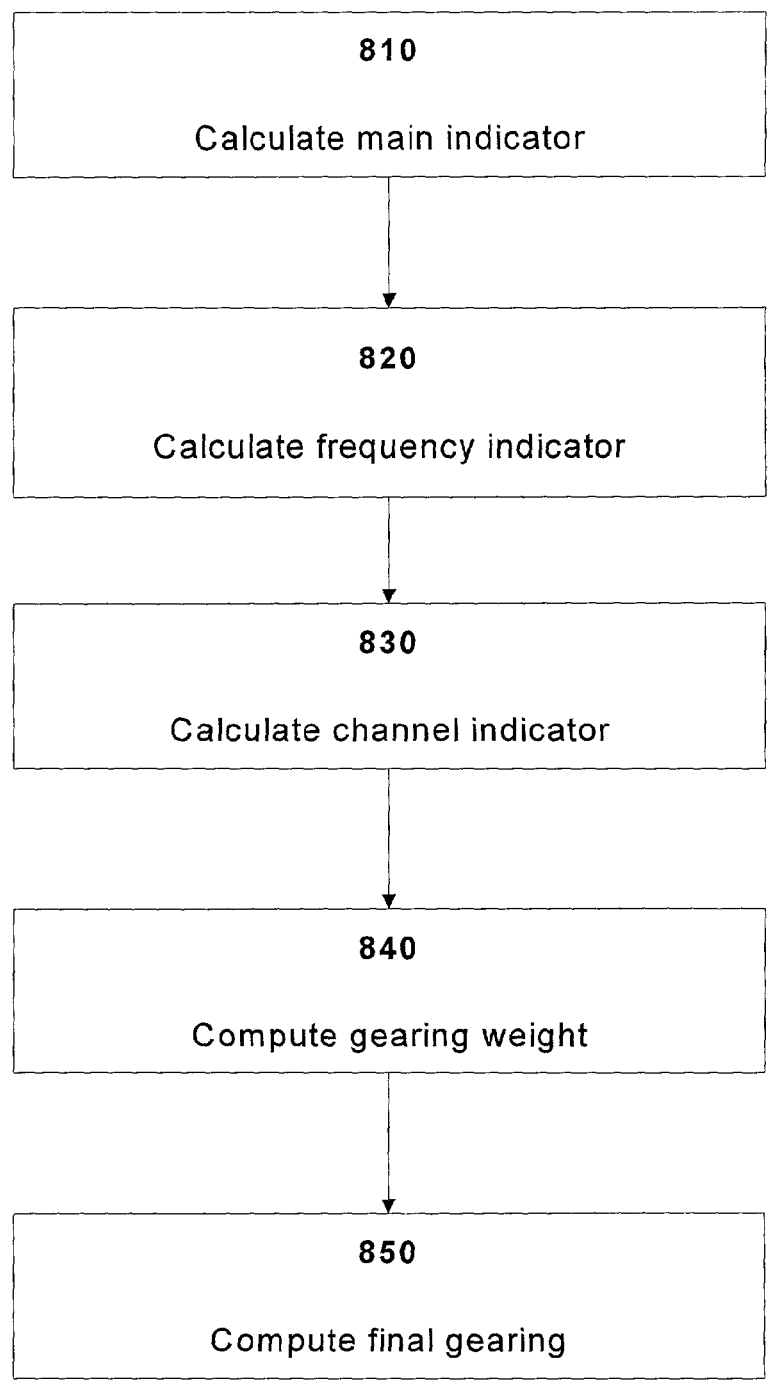
FIG. 8 depicts sub-model-related steps of a preferred embodiment.

The structure of one sub-model can be essentially divided into five parts (see FIG. 8):

1. The calculation at step 810 of a suitable main indicator for the specific sub-model, which after the application of a simple nonlinear discretization function provides a first raw gearing (either 1 or −1).
2. The calculation at step 820 of a first market indicator, the frequency indicator $I_{trad.freq.}$, which describes the current degree of noisiness in the market (and therefore whether trend-following should be avoided).
3. The calculation at step 830 of a second market indicator, the channel indicator $I_{channel}$ which describes to what degree the current and most recent market situation can be characterized by channel configurations.
4. Computing at step 840 a weight w to be applied to the raw gearing at the end. This weight represents the strategy chosen in view of the market indicators. This is a key feature in making the trading model adaptive. This function w is also modulated by a "spread function" that accounts for the loss due to bid-ask spreads (each "round-trip" transaction leads to a loss of one spread, which may affect the performance in case of frequent transactions of the sub-model).
5. Computing at step 850 the resulting gearing as the product of the raw gearing computed in part 1 and the weight derived from the market indicators. This gearing is later combined with the gearings of other sub-models. The combination is then discretized to provide the final, discrete gearing recommendation of the model.

The trading model works in real-time, with tick-by-tick intra-day data. Therefore, it preferably has a way to deal with the strong intra-daily seasonality of volatility. Price movements around 4:00 GMT, when volatility tends to be low, should be treated differently from price movements of the same size around 14:00 GMT, when volatility is usually high.

The time scale $\sigma$ has been developed for the deseasonalization of volatility; its computation is explained in detail above and in (Dacorogna 1993). In all the indicator computations presented in the following description, we use $\sigma$-time rather than physical time as the basic time scale.

A main indicator z is created with the help of exponential moving averages (EMA). These are computed by an iterative application of the EMA-operator to the (not necessarily regularly-spaced) time series x(t). Depending on the number of iterations, we obtain a moving average based on a specific kernel function. We define:

$$z = z(t) = \frac{\chi(t)}{\sqrt{EMA[\Delta t_\sigma, i', j'; \chi^2](t)}}, \quad (25)$$

with a scaling function in the denominator, where $\chi(t)=$ $$EMA[\Delta t_{short}, i'', j''; x](t)-(1+\epsilon)EMA[\Delta t_{model}, i, j; x](t)+\epsilon EMA[\Delta t_{long}, i, j; x](t) \quad (26)$$

and x denotes the mean logarithmic value of bid and ask prices:

$$x = \frac{\log p_{bid} + \log p_{ask}}{2}. \quad (27)$$

The time t is meant to be the $\sigma$-time, as explained above. The parameters i and j determine the form of the kernel of the moving average: $1 \leq i \leq j$. Choosing $i>1$ results in a kernel whose rectangular-like form starts after a lag, rather than immediately. See U.S. Provisional Pat. Application 60/200,743, filed May 1, 2000, to Zumbach & Müller, the contents of which are incorporated herein by reference; see also Zumbach, G. O. & Müller, U. A., *Operators on Inhomogeneous Time Series*, International Journal of Theoretical and Applied Finance (2000.

The EMA-function $EMA[\Delta t_{short}, i, j; x](t)$ serves the purpose of obtaining steadier data (avoiding "bid-ask bouncing"); the time horizon $\Delta t_{short}$ is therefore chosen to be in the range of seconds. The specific time horizon of the given sub-model is given by $\Delta t_{model}$. The main indicator (with positive small $\epsilon$) leaves space for accounting weakly for possible curvature effects. This is done by including a component corresponding to the (discretized) second derivative which can be done with the help of a moving average $EMA[\Delta t_{long}, i, j; x](t)$ with longer memory $\Delta t_{long}$. Preferably $\Delta t_{long} = 2\Delta t_{model}$ is chosen.

Concerning the scaling function $\sqrt{EMA[\Delta t_\sigma, i', j'; \chi^2](t)}$, a specific choice of $\Delta t_\sigma$ and (i', j') is necessary. We choose $\Delta t_\sigma$ to be multiple of $\Delta t_{model}$, (i.e., $\chi$ is scaled with its own long-term moving average). For the iteration numbers i' and j' we choose i'=1 and J'=4, which corresponds to a kernel function that has a plateau for values close to zero and decays slowly for larger values (the center of gravity is given by $\Delta t_\sigma$). Although this indicator scaling provides some adaptivity, the overall ability of the entire sub-model to adapt to different market 'states is not yet reached by this scaling function. For this purpose, we need the market state indicators described below.

The indicator z serves as the argument of the following iteratively defined discrete gearing function: Given a gearing g at the previous quote (at $t_{prev.}$), the gearing at the current quote (at $t_{now}$) is defined to be $$g(t_{now}) = \begin{cases} +1 & \text{if } z > z_0 \\ g(t_{prev.}) & \text{if } |z| < z_0 \\ -1 & \text{if } z < -z_0 \end{cases} \quad (28)$$

where the initialization is given by $g(t_{start})=0$. This defines the first raw gearing of the main indicator. The threshold value $z_0$ is a fixed parameter of the model (to be optimized), constant over time.

In order to account for different conditions of the markets (where a certain gearing g must be interpreted differently) the gearing g is weighted with a market state indicator function w=w(market, z) such that a modulated gearing $g_m$ is finally obtained:

$$g_m = w(\text{market}, z) \cdot g \quad (29)$$

The function w, which will be defined in detail below, is a function of several different market state indicators. The gearing values $g_m$ of the different sub-models then serve as the basis for a last discretization step that provides the final gearing of the overall model (see below, eq. 54).

The market indicator function w(market, z) accounts for a wide range of market states. Here we choose w to be non-negative, $w \in [0,1]$; the model avoids contrarian strategies (positions opposite to the gearing recommendation g(z)). The weight function w(market, z) and the strategy of the model depend on two different market state indicators, a channel indicator and a noisy market indicator.

One market state indicator is designed to detect sideways markets through the identification and characterization of what we call channel configurations (a term that originates from technical chart analysis). Channel configurations are the result of a market consensus among traders. Here, we use a specially-designed channel indicator describing the degree to which a recent price development can be described as a channel by counting the number (and amplitude) of oscillations of prices within a given time interval and a range of prices. This channel indicator recognizes not only static price ranges; it adjusts to an overall linear trend of the channel as well as a possible narrowing ("triangle formation").

For the definition of the channel indicator $I_{channel}$ we proceed as follows: We choose a time horizon $\Delta T_{channel}$ to specify the length of possible channels (other sub-models have channels of different lengths). This length $\Delta T_{channel}$ is a high multiple of the time horizon $\Delta t_{model}$ of the main model indicator (a parameter that needs to be optimized). The channel extends over the time interval C of size $\Delta T_{channel}$. At a given time t we define the interval $$C = [t - \Delta T_{channel}, t] \quad (30)$$

which covers the immediate past until time t.

In the following the variable x refers to the logarithmic price in a smoothed form: a moving average of the original x from eq. 27, with a memory (center of gravity of the kernel) of $\Delta t = 1/120 \cdot \Delta T_{channel}$. This smoothing leads to neglecting extremely fine details of the price history details in the channel determination—a desired effect that reflects also the view of market practitioners. The usage of MAs instead of original prices also leads to a higher degree of statistical stability for the definition of the channel. Within the interval C we store 120 different past values of the moving average (with a certain overlap of the kernel functions) that we name $x_k = x(t_k)$, $t_k \in C$, indexed by $k=\{1, \ldots, N\}$ (where N=120).

We make different particular choices for the time horizon $\Delta T_{channel}$ in eq. 30. In order to adapt the channel indicator to particular situations where a market just enters into a channel, we choose different time horizons $j\Delta T_{channel}$ that are certain fractions of $\Delta T_{channel}$ (e.g., $j=\{0.5, 0.6, \ldots, 0.9, 1\}$), and choose j such that the corresponding time interval C shows the the most convincing channel features (measured by a variable introduced below; see eq. 38).

The following steps lead to the definition of the market state indicator:

1. De-trending: We evaluate a possible trend of the price movements in the interval C regression and obtain the slope m for the trend of price movements in the interval C as the offset constant a. This trend is then subtracted such that we obtain the residuals $$r(t_k) = x(t_k) - (a + m \cdot t_k). \quad (31)$$

2. Narrowing of the channel interval: As a subsequent step we perform a second linear regression, this time on the absolute values $|r(t_k)|$ of the residuals of eq. 31, in order to account for possible channel narrowings ("triangle formations"). This leads to the slope s and the offset b. In case of a negative slope s the residuals $r(t_k)$ are rescaled with the inverse of the resulting (decreasing) linear function to give $\tilde{r}(t_k)$. We require s=0 if the linear regression results in a positive slope, as we are not interested in the unusual configuration of a widening channel:

$$\tilde{r}(t_k) = \frac{r(t_k) \cdot b}{b + s \cdot t_k}, s \leq 0. \quad (32)$$

A further constraint that we impose is a lower limit for s such that the channel width at the end of the interval C be smaller than 30% of the channel size at the beginning of C.

3. Defining the channel frequency: We next define the interval $[\min_{ch}, \max_{ch}]$ by choosing $\min_{ch}$ ($\max_{ch}$) as the minimum (maximum) of the price residuals $\tilde{r}(t_k)$ for $t_k \in C$:

$$\min_{ch} = \min_{t_k \in C} [\tilde{r}(t_k)] \quad \max_{ch} = \max_{t_k \in C} [\tilde{r}(t_k)] \quad (33)$$

The value of $(\max_{ch} - \min_{ch})$ defines a sort of width of the residual channel. Instead of using this value for further calculation, we define another width $\Delta P$ of the channel that has a certain narrowing term in the case of triangle formations (s<0):

$$\Delta P = (\max_{ch} - \min_{ch}) + s \cdot \Delta T_{channel} \quad (34)$$

We now track the number of times the residual function $\tilde{r}(t_k)$ approaches $\min_{ch}$ and $\max_{ch}$ (alternating between the two borders). This number is given by the following expression $$Q = Q(\Delta T_{channel}, r_c) = N(\{k | m_k \neq m_{k-1}, 2 \leq k \leq N\}) \quad (35)$$

where $$m_k = \begin{cases} -1 & \text{if } (\tilde{r}(t_k) - \min_{ch}) < r_c \\ +1 & \text{if} (\max_{ch} - \tilde{r}(t_k)) < r_c \\ m_{k-1} & \text{otherwise (0 in the case } k = 1) \end{cases} \quad (36)$$

with a tolerance level $r_c$. Together with this number Q we obtain a sequence of time intervals separated by the time points $t_q$ of the crossings over $r_c$ that lead to a count in eq. 35. Within all these Q intervals, we find local minima and maxima of $\tilde{r}(t_k)$, which are used to define our modified oscillation frequency. This is defined as the sum of absolute differences between subsequent local extrema (scaled by the range of global extrema):

$$F = F(\Delta T_{channel}, r_c) \qquad (37)$$

$$= \frac{\sum_{q=1}^{Q} [\max\{|\tilde{r}(t_k)| | t_k \in [t_{q-1}, t_q]\} + \max\{|\tilde{r}(t_k)| | t_k \in [t_q, t_{q+1}]\}]}{\max_{ch} - \min_{ch}} - 1$$

Instead of choosing just one tolerance level $r_c$ of an approach to the top or bottom of the channel, we take several $r_c$ values in the range of 20%-40% of the channel width. The average value of F over this range of tolerance levels $r_c$ is calculated. This average is more stable and less sensitive to random effects than an F based on only one $r_c$ level. An offset of −1 is introduced to account for the minimum number of counts (there must be one count at least, even if there are no oscillations).

4. Definition of the channel indicator: In order to obtain a final indicator for the strength of a channel configuration in the market, the function F is scaled with a factor containing the width $\Delta P$, the slope of the trend m, and the time interval $j\Delta T_{channel}$:

$$I'(t, j\Delta T_{channel}, r_c, \mu, \nu) = \frac{\left(\frac{\Delta P}{\nu(\Delta T_L)}\right)^{\mu_j \nu}}{\sqrt{1 + \left(\frac{mj\Delta T_{channel}}{\Delta P}\right)^2}} F(t, j\Delta T_{channel}, r_c) \qquad (38)$$

where the second factor F is more important than the only moderately-varying first factor. The variable $\nu(\Delta T_L)$ is a long-term moving average of the volatility measured with a memory of a multiple of the channel length. This definition is aimed at making the scaling factor adaptive to structural changes of the FX rate (e.g., a substantial volatility increase). The indicator I' receives a high value when the price alternates often between the borders of the considered interval, which corresponds exactly to what we want to describe as a channel. The wider this channel (factor $$\left(\frac{\Delta P}{\nu(\Delta T_L)}\right)^\mu$$

with an exponent $\mu$=0.3), the longer the channel (factor $(j\Delta T_{channel})^\nu$ with $\nu$=0.5) and the smaller the slope as compared to the width $$\left(factor\ 1 \Big/ \sqrt{1 + \left(\frac{m\Delta T_{channel}}{\Delta P}\right)^2}\right),$$

the higher the indicator value.

We emphasize here again that we choose channels of different lengths in order to make the channel indicator more flexible, especially in situations where the market just entered a new channel (which is short at the beginning). The final indicator $I_{channel}$ is then given as the maximum among these channels:

$$I_{channel}(\Delta T_{channel}, r_c, \mu) = \max_{j=\{1,\ldots 5\}} (I'(j\Delta T_{channel}, r_c, \mu)) \qquad (39)$$

The channel indicator $I_{channel}$ is found to be correlated to volatility (and the ratio or difference of coarse and fine volatility). All these quantities measure, in one way or another, the intensity of price changes. An advantage of the channel indicator lies in its ability to quickly catch the disruption of an old market state (channel break). These breaks may occur very suddenly; purely volatility-based indicators are unable to catch them with the same speed.

Another measure of the market state is introduced by a second market state indicator, one that measures directly the "noisiness" of the market. In sideways markets (which are not always described by a clear channel configuration) the short-term noise dominates the large movements and long-term trends. This can lead to frequent, loss-making transactions of a trend-following model. A noise indicator aims at detecting these situations, and enables the incorporation of corresponding features into the definition of the market state function w. The indicator is similar to a direction change frequency as defined in Guillaume, D. M, Dacorogna, M. M., Davé, R. D., Müller, U. A., Olsen, R. B., and Pictet, O. V., *From the bird's eye to the microscope: A survey of new stylized facts of the intra-daily foreign exchange markets,* 1 Finance and Stochastics 95 (1997), but is directly associated with the main indicator z itself. The definition of the noise indicator is as follows:

$$I_{trad.freq.} = \text{EMA}[\Delta t_{trad.freq.}, i, j; \delta](t) \qquad (40)$$

with a moving average with a specific kernel and a long memory $\Delta t_{trad.freq.}$ that is another parameter in the optimization of the model. The function $\delta$ is defined as follows:

$$\delta = \begin{cases} \dfrac{1}{t_{now} - t_{prev.}} & \text{if } g(t_{now}) \neq g(t_{prev.}) \\ 0 & \text{otherwise} \end{cases}, \qquad (41)$$

where $t_{now}$ and $t_{prev.}$ denote the times of the current and previous quote, respectively, and g is defined by eq. 28. This definition of $I_{trad.freq.}$ essentially corresponds to the trading frequency of an unconditional trend-following model, that is, a model that strictly follows the trading rule specified in eq. 28.

This indicator essentially tells us when trend-following is dangerous: a high value of $I_{trad.freq.}$ occurs in markets with a high degree of noise. An unconditional trend-following model makes many transactions that lead to subsequent losses. Accordingly, a trend-following strategy should only be followed in market situations with a low value of the indicator $I_{trad.freq.}$. The indicator defined in eq. 40 has a very important feature: a high autopredictive power (high autocorrelation). Indeed, our studies have shown that $I_{trad.freq.}$ possesses significant autocorrelation extending to lags of one order of magnitude longer than the memory $\Delta t_{trad.freq.}$ of the moving average. By being based on the main indicator z, $I_{trad.freq.}$ also has the advantage of indicating exactly the type of noise that is most damaging for trading.

The two market state indicators—the channel indicator and the noise indicator—are now used to define the market state function.

When defining an adaptive weight function w for the main indicator we first want to differentiate three market states.

1. The price is located within a clear channel (high value of $I_{channel}$).
2. A break out of a clear channel occurs (high value of $I_{channel}$, and the current price clearly moves out of the boundaries of the recent channel).
3. There is no channel present (low value of $I_{channel}$). In this case we differentiate between market states with a high value of the noise indicator $I_{trad.freq.}$ and those with a low trading frequency.

These different market situations must be treated differently for the definition of a final gearing—each one of them leads to a different form of the weight function w.

Before defining the specific strategy, we must set up rules to differentiate the different configurations of the market with respect to the channel indicator. In order to define a price to be "inside a channel" or in a "channel break," we must refer to a specific channel of the recent past. One way to do this is to choose the last computed channel without accounting for any other recent channel computed at a previous time. If we want to account for possible different relevant channels in the recent past, we must construct a "channel memory" in order to find the most significant channel of the recent channels. The "quality of a channel" at time t is measured by the indicator $I_{channel}(t)$. For our model the rule for selection of the most relevant channel at a time t is as follows: Given the current indicator value $I_{channel}(t)$, the most significant channel $I_{channel}^{best}(t)$ at the current time t is chosen as $$I_{channel}^{best}(t) = \max\left(I_{channel}^{best}(t_{before})e^{-\frac{t-t_{before}}{t_{decay}}}, I_{channel}(t)\right) \quad (42)$$

where $t_{decay}$ is a suitably-chosen decay constant. The channel boundaries of recent channels are extrapolated with the linear trend only, and not with the narrowing trend.

The "inside a channel" as well as the "channel break" situation at time t is conditional to a considerable channel formation, characterized by a high value of $I_{channel}^{best}(t)$. We choose a threshold $tr_c$ (which becomes an important parameter of the model), below which we do not consider the price to be in a channel. This parameter is also exposed to a certain "hysteresis": it acquires a higher value if the recent market configuration has not been detected to be a channel, whereas it is lowered if the market has already been in a channel before.

In order to detect a current price to be inside a channel state at time t, the following formal conditions have to be satisfied:

$$(I_{channel}^{best})(t) > tr_c) \vartheta (\min_{ch} - tol_{channel}\Delta P < x(t) < \max_{ch} + tol_{channel}\Delta P) \quad (43)$$

where the parameter "$tol_{channel}$" defines a tolerance level that has to be exceeded before we detect an outbreak.

The situation of a channel break differs from the "inside the channel" situation only insofar as the price moves outside the channel borders. In order to detect a channel outbreak at point t, the following formal conditions have to be satisfied:

$$(I_{channel}^{best}(t) > tr_c) \vartheta$$
$$[(x(t) - \max_{ch}) > tol_{channel}\Delta P \vee (-x)(t) + \min_{ch}) > tol_{channel}\Delta P] \quad (44)$$

Once the market is in a channel-break situation, it remains there as long as the main indicator z keeps its sign, irrespective of eq. 44.

The situation of no channel presence in the market can be simply characterized by $$I_{channel}^{best}(t) < tr_c \quad (45)$$

The noise indicator $I_{trad.freq.}$ is only considered in the no-channel situation: $I_{channel}^{best}(t) < tr_c$, eq. 45. Here, we differentiate between two cases for the definition of the market state function w: $I_{trad.freq.}$ exceeds a threshold parameter $tr_{noise}$ or is lower than this threshold:

1. $I_{trad.freq.} < tr_{noise}$ \quad (46)

2. $I_{trad.freq.} > tr_{noise}$ \quad (47)

Being inside a channel can be a dangerous condition for a trend-following model (as well as a high value of $I_{trad.freq.}$). The model is likely to recommend frequent transactions mostly at the wrong time—just before the trend to be followed is turning. A price development inside a detected channel should not be followed. As a consequence, a preferred (sub)model does not give any trading recommendation in this case, in other words:

$$w=0 \quad (48)$$

There will be neither trend-following (w>0) nor contrarian strategies (w<0) in this case. The expression "contrarian" refers to the given time horizon. Evidently, the global model can take a position "contrarian" to the raw gearing $g_z$ of a single time horizon, in the case that other horizons interpret the market differently. There is the possibility of adapting a very restricted trend-following strategy for the case that the price moves from a channel border with a main indicator indicating a trend towards the other side of the channel. This strategy component can be systematically tested independently. First tests did not yield a convincing improvement of the results, though, when this additional strategy is applied.

A break of a channel configuration constitutes a substantial or sometimes even structural change in the market and should be specifically accounted for in the trading model. The price development occurs outside a former "market consensus" as formulated by eq. 44. The model should react quickly—old assumptions on certain turning point behavior inside the channel lose their validity. We distinguish between whether a break occurs in the same direction as the trend of the channel or against that trend. The latter case should be considered with more caution. We define the strategy function as follows:

$$w' = \begin{cases} 1 & \text{if } mg > 0 \\ (1 - K_c) & \text{otherwise} \end{cases}, K_c > 0 \quad (49)$$

The final w is obtained by a modulation with a function $F_1$(distance, $I_{channel}^{best}$) depending on the distance of the price from the channel border and on the channel indicator value:

$$w = w'F_1(\text{distance}, I_{channel}^{best}), 0 \leq F_1 \leq 1 \quad (50)$$

When the distance from the channel is small, right after the break, $F_1$ is also small, but it rapidly grows and saturates at a higher level with increasing distance from the channel. This saturation level is 1 for clear channels with high $I_{channel}^{best}$ and lower in case of lower $I_{channel}^{best}$.

In case there is no channel present in the market ($I_{channel}^{best}$ (t)<$tr_c$), the noise indicator $I_{trad.\ Freq.}$ comes into play. The market state function is here defined as follows:

$$w = \begin{cases} w_{trend} & \text{if } I_{trad.\ freq.} < tr_{noise} \\ 0 & \text{otherwise} \end{cases} \quad (51)$$

where $$w_{trend} = c_2 F_2(I_{channel}), 0 \leq F_2 \leq 1, 0 < c_2 < 1 \quad (52)$$

The parameters $tr_{noise}$ and $c_2$ enter into the model. As before with the case of a channel-break, the final w is scaled with a function $0 \leq F_2 \leq 1$, depending on the channel indicator, in order to give a smooth transition between channel and out-of-channel situations.

It should be mentioned that the presented threshold values are all subject to a "hysteresis" modulation In other words, their value depends on the previous state of the market. This avoids random oscillation between different market states and makes them more inert.

Each sub-model has a gearing recommendation $g_m$ resulting from eq. 29. A preferred trading model algorithm integrates these gearing recommendations to produce one final gearing recommendation G.

The set of sub-models and their horizons has to be chosen. A factor of about 2 between neighboring sub-model horizons is preferably selected. The longest main indicator has a horizon of 32 days, its channel a length of a few months. We choose the shortest main indicator to have a horizon of 3 hours in σ-time (corresponding to an hour or less in physical time during the most active trading periods). However, a sub-model with a main indicator horizon of about 12 hours makes little sense as there is an empirically observable gap between genuine intra-day traders and traders with overnight positions. Altogether 8 sub-models are preferably employed.

The goal is to optimize the risk-corrected return ensuing from the gearing recommendations G. G is changing over time and can be seen as a time series. Noisy oscillations of G should be avoided as every move of G implies a transaction and thus transaction costs. Therefore, the formula for G should dampen the noise originating from the varying $g_m$ values of the many sub-models.

The following sub-model integration formula is chosen to produce gearing recommendations G:

$$G_m = c \frac{1}{1 + \sum_{i=1}^{n} w_i} \sum_{i=1}^{n} g_{m,i} \quad (53)$$

where n is the total number of sub-models (n=8 in this embodiment). $G_m$ mainly reflects those sub-models with a clear view. Sub-models in a channel or sideways (noisy) market (where the value $I_{trad.freq.}$ is large) have w and thus $g_m$ values close to zero; they hardly contribute to $G_m$—they are "switched off". The constant c is a scaling constant that is chosen such that the following discretization can be performed with threshold values between −1 and 1.

$G_m$ is a volatile quantity changing its value at every tick. It has to be converted to a discrete gearing value G with as few noisy oscillations as possible. The discrete gearing values are preferably either −1, −½, 0, ½, 1 (short, half-short, neutral, half-long, long). A finer gearing scheme can be implemented in order to lower the risk and, in thin markets, to keep trade sizes small and avoid slippage. The following formula for G is related to the above 5-position scheme and can be easily adapted to other schemes:

$$G = \begin{cases} 1 & \text{if } G_m \geq 1 \\ \max\left(\frac{1}{2}, G_{old}\right) & \text{if } 1 > G_m \geq \gamma_1 \\ \max(0, G_{old}) & \text{if } \gamma_1 > G_m \geq \gamma_2 \\ G_{old} & \text{if } \gamma_2 > G_m < -\gamma_2 \\ \min(0, G_{old}) & \text{if } -\gamma_2 \geq G_m < -\gamma_1 \\ \min\left(-\frac{1}{2}, G_{old}\right) & \text{if } -\gamma_1 \geq G_m < -\gamma_0 \\ -1 & \text{if } -\gamma_0 \geq G_m \end{cases} \quad (54)$$

where $G_{old}$ is the G value before computing the new $G_m$. This formula acts like a hysteresis with a dampening effect (or a dragging anchor): G moves only if $G_m$ substantially deviates from the old value $G_t$. The threshold values have the following relation:

$$1 > \gamma_1 > \gamma_2 > 0 \quad (55)$$

Many parameters of the algorithm are "weak" parameters and are not subject to systematic parameter optimizations. They are chosen according to the logics of the algorithm and from separate studies, and then they are frozen.

Only a few essential parameters such as the main threshold values are systematically optimized. Limiting the overall number of parameters to be optimized decreases the danger of overfitting—fitting random features of the specific in-sample period rather than real market structures. The parameter values are as much as possible optimized for all time horizons and FX rates together; different treatments of these should follow from the adaptivity of the algorithm rather than from separately optimizing parameters. The most relevant parameters for optimization are:

- the channel length $\Delta T_{channel}$ (see eq. 39)
- thresholds for $I_{trad.freq.}$ (see eq. 46), $I_{channel}$ (see eq. 45), and the main indicator z ($z_0$, see eq. 28)
- the memory $\Delta t_{trad.freq.}$ (see eq. 40)
- the channel tolerance $tol_{channel}$ (see eq. 43)
- the channel memory $t_{decay}$ (see eq. 42).

An important additional parameter is the scaling constant c in eq. 56.

The full sample (the full time period with available raw data) is preferably divided into alternative pieces of a length of about 15 months: in-sample, out-of-sample, in-sample, out-of-sample, . . . . Only the in-sample periods are used for performance measurement during the whole optimization phase.

After the in-sample optimization, the algorithm and its parameters are frozen. The out-of-sample test then measures the performance of the model in the out-of-sample periods—those that have not been tested yet.

If some FX rates (or other financial instruments) have been left out in the in-sample optimization, their test in the full sample can also be considered as a valid out-of-sample test.

It is to be expected that the model performance is not as good out-of-sample as in-sample. The out-of-sample performance is a much better (though not perfect) measure of the true performance in the future than the in-sample performance.

While the subject invention has been particularly shown and described with reference to preferred embodiments of the system and methods thereof, it will also be understood by those of ordinary skill in the art that various changes, variations, and modifications in form, details, and implementation may be made therein without departing from the spirit and scope of the invention as defined by the appended claims. For example, although the description of preferred embodiments has focused on a currency trading system, it will be apparent to those skilled in the art that the subject invention is also applicable to securities markets, options markets, and other markets. Also, because U.S. Provisional Application No. 60/274,174, filed Mar. 8, 2001, has been incorporated herein in its entirety by reference, the trading models disclosed therein, in particular in Chapter 11 (pages 286-338), are part of this disclosure, and are intended to be encompassed by the appended claims.

TABLE 2

| FX rate | Sample | $\bar{X}$ | $X_{A} \text{eff}$ | D | P/L |
|---|---|---|---|---|---|
| USD/DEM | in sample | 19.1% | 13.5% | 8.4% | 0.48 |
| | out of sample | 26.9% | 19.0% | 7.6% | 0.41 |
| | ex ante | 28.8% | 22.2% | 3.9% | 0.69 |
| USD/JPY | in sample | 15.1% | 9.7% | 7.5% | 0.61 |
| | out of sample | 13.4% | 8.7% | 8.2% | 0.70 |
| | ex ante | −0.2% | −1.1% | 4.2% | 0.57 |
| GBP/USD | in sample | 14.6% | 8.9% | 11.1% | 0.43 |
| | out of sample | 20.9% | 14.9% | 7.5% | 0.46 |
| | ex ante | 13.7% | 11.8% | 7.1% | 0.38 |
| USD/CHF | in sample | 18.4% | 14.4% | 6.9% | 0.69 |
| | out of sample | 12.5% | 6.2% | 12.0% | 0.51 |
| | ex ante | 22.7% | 15.7% | 3.2% | 0.68 |
| USD/FRF | in sample | 19.3% | 13.0% | 10.3% | 0.48 |
| | out of sample | 17.4% | 12.4% | 6.3% | 0.48 |
| | ex ante | 9.1% | 6.5% | 5.7% | 0.49 |
| USD/NLG | in sample | 20.3% | 16.6% | 7.6% | 0.63 |
| | out of sample | 19.6% | 11.1% | 8.4% | 0.53 |
| | ex ante | 28.9% | 20.4% | 4.2% | 0.74 |

TABLE 2-continued

| FX rate | Sample | $\bar{X}$ | $X_{A} \text{eff}$ | D | P/L |
|---|---|---|---|---|---|
| USD/ITL | in sample | 11.2% | 5.8% | 13.3% | 0.46 |
| | out of sample | 20.2% | 14.9% | 6.4% | 0.47 |
| | ex ante | 18.8% | 13.5% | 2.9% | 0.56 |
| Average | in sample | 16.9% | 11.7% | 9.3% | 0.54 |
| | out of sample | 18.7% | 12.5% | 8.1% | 0.51 |
| | ex ante | 17.4% | 12.7% | 4.5% | 0.59 |

In-sample period (1.3.86 to 1.3.89 for USD/DEM, USD/JPY, GBP/USD and USD/CHF, and 1.12.86 to 12.3.89 for USD/NLG, USD/FRF and USD/ITL), the out-of-sample period (1.3.89 to 1.10.91 and 1.12.89 to 1.10.91, respectively) and the ex ante period (1.10.91 to 4.9.92).

TABLE 3

| FX rate | Model | $\bar{X}$ | $X_{A} \text{eff}$ | D | P/L |
|---|---|---|---|---|---|
| USD/DEM | MA(20) | 8.8% | 3.3% | 14.3% | 0.37 |
| | Preferred model | 21.9% | 14.1% | 7.7% | 0.41 |
| USD/JPY | MA(20) | −0.7% | −7.1% | 39.9% | 0.16 |
| | Preferred model | 16.2% | 12.1% | 8.2% | 0.66 |
| GBP/USD | MA(20) | 8.7% | 4.3% | 9.3% | 0.45 |
| | Preferred model | 17.7% | 11.4% | 10.9% | 0.43 |
| USD/CHF | MA(20) | 7.9% | 1.1% | 18.9% | 0.35 |
| | Preferred model | 17.7% | 10.7% | 13.0% | 0.62 |
| USD/NLG | MA(20) | 10.5% | 6.3% | 12.8% | 0.41 |
| | Preferred model | 20.1% | 14.2% | 8.9% | 0.57 |
| USD/FRF | MA(20) | 8.8% | 4.4% | 12.7% | 0.30 |
| | Preferred model | 22.1% | 15.9% | 8.6% | 0.49 |
| USD/ITL | MA(20) | 6.6% | 2.3% | 14.4% | 0.34 |
| | Preferred model | 15.3% | 10.3% | 9.2% | 0.46 |

Performance Comparisons with a 20 Day MA Model (between the preferred trading models and a more conventional 20-day moving-average model). The test was conducted from 3.3.86 to 1.10.91 (major rates) and from 3.12.86 to 1.10.91 (minor rates). The same performance indicators as in Table 2 are displayed.

TABLE 4

| | Preferred Trading Model | | | Preferred Trading Model Portfolios | | |
|---|---|---|---|---|---|---|
| Exchange rates | Annualized return | Maximum drawdown | Drawdown period | Annualized return | Maximum drawdown | Drawdown period |
| USD/GBP | 17.61% | 11.07% | 95 days | | | |
| USD/DEM | 23.06% | 8.36% | 133 days | 18.35% | 5.24% | 22 days |
| USD/JPY | 14.19% | 8.24% | 21 days | | | |
| USD/DEM | 23.06% | 8.36% | 133 days | | | |
| USD/CHF | 15.77% | 12.00% | 142 days | 17.73% | 5.41% | 22 days |
| USD/JPY | 14.19% | 8.24% | 21 days | | | |
| USD/GBP | 17.61% | 11.07% | 95 days | | | |
| USD/CHF | 15.77% | 12.00% | 142 days | 15.95% | 6.26% | 21 days |
| USD/JPY | 14.19% | 8.24% | 21 days | | | |
| USD/DEM | 23.06% | 8.36% | 133 days | | | |
| USD/CHF | 15.77% | 12.00% | 142 days | 18.95% | 6.62% | 149 days |
| USD/GBP | 17.61% | 11.07% | 95 days | | | |
| USD/FRF | 18.51% | 10.28% | 129 days | | | |
| USD/DEM | 23.06% | 8.36% | 133 days | 18.28% | 6.54% | 129 days |
| USD/JPY | 14.19% | 8.24% | 21 days | | | |

Performance Results of a Portfolio of Trading Models (portfolios of three preferred trading models with a stable, equal distribution of capital among the three models over a test period from Mar. 3, 1986 (Dec. 1, 1986) to Mar. 2, 1992).

TABLE 5

| Strategy | Selection Scheme | Voting Scheme | $S_{in}$ $S_{out}$ | $X_{eff}$ USD-DEM | $X_{eff}$ USD-JPY | $X_{eff}$ GBP-USD | $X_{eff}$ Mean |
|---|---|---|---|---|---|---|---|
| Trend Following | $\Theta(\text{fxf}[50], 2)$ | 2 | 0.4 | 1.46 | 1.61 | 0.22 | 1.10 |
| Contrarian | $\Theta(\text{fxf}[75], 1)$ | 1 | 0.3 | 2.66 | 6.93 | 5.16 | 4.91 |

TABLE 5-continued

| Strategy | Selection Scheme | Voting Scheme | $S_{in}$ $S_{out}$ | $X_{eff}$ USD-DEM | $X_{eff}$ USD-JPY | $X_{eff}$ GBP-USD | $X_{eff}$ Mean |
|---|---|---|---|---|---|---|---|
| Hybrid | Θ(fxf[50], 2) Θ(fxf[75], 1) | 1 | 0.15 | 3.00 | 9.20 | 1.69 | 4.63 |
| Mixed | Θ(fxf[75], 3) | 1 | 0.2 | 1.28 | 11.81 | 0.20 | 4.43 |
| Model 40 | | | | 1.80 | −3.61 | −18.35 | −6.72 |
| Model 50 | | | | −1.21 | −0.34 | −10.33 | −3.96 |

Results for the purely trend-following and purely contrarian models as well as for the mixed and hybrid models (constructed with one trend-following and one contrarian sub-model acting synchronously at every hour) in the third in-sample band (to which the sub-models have not been exposed). Indicated in the table are the set high frequency parameters (including the selection scheme) in order to get the highest mean $X_{eff}$ over the 3 rates studied so far. The individual performances for each rate that contribute to the mean are also included. (It should be noted that the best results for the individual rates are of course different). For comparison, the corresponding performance for other preferred models in the third in-sample band (24.12.92 to 22.06.94) are also presented.

TABLE 6

Trend-Following Horizons using Θ(fxf[50], 2)

| Rate/Hour | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| USD-DEM | 28 | 28 | 18 | 28 | 28 | 18 | 28 | 28 | 28 | 28 | 28 | 28 | 28 | 28 | 15 | 15 | 15 | 18 | 28 | 28 | 28 | 28 | 28 | 28 |
| USD-JPY | 17 | 17 | 15 | 15 | 15 | 15 | 15 | 15 | 15 | 15 | 15 | 15 | 15 | 15 | 15 | 15 | 15 | 15 | 15 | 15 | 15 | 15 | 15 | 16 |
| GBP-USD | 14 | 14 | 14 | 14 | 16 | 16 | 16 | 16 | 16 | 15 | 15 | 15 | 17 | 14 | 14 | 14 | 14 | 14 | 14 | 14 | 16 | 16 | 16 | 16 |

Variation of trend-following sub-model horizons (in days) over the hours of the day using the selection scheme Θ(fxf[50],2) for the exchange rates studied.

TABLE 7

Contrarian Horizons using Θ(fxf[75], 1)

| Rate/Hour | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| USD-DEM | 4 | 5 | 4 | 4 | 4 | 3 | 7 | 3 | 3 | 3 | 3 | 3 | 7 | 6 | 7 | 7 | 7 | 7 | 7 | 3 | 3 | 3 | 3 | 3 |
| USD-JPY | 4 | 3 | 3 | 6 | 6 | 4 | 4 | 4 | 4 | 4 | 4 | 4 | 4 | 1 | 5 | 6 | 6 | 6 | 6 | 4 | 6 | 3 | 3 | 3 |
| GBP-USD | 3 | 3 | 7 | 7 | 7 | 7 | 3 | 3 | 3 | 3 | 3 | 3 | 7 | 14 | 13 | 4 | 4 | 3 | 4 | 4 | 4 | 6 | 6 | 6 |

Variation of contrarian sub-model horizons (in days) over the hours of the day using the selection scheme Θ(fxf[75],1) for the exchange rates studied.

What is claimed is:

1. A method of trading assets on a market, comprising the steps of:
   (a) receiving price data for an asset over one or more computer networks;
   (b) receiving current system position information;
   (c) storing said received asset price data and said current system position information in a computer-readable medium;
   (d) calculating trade recommendation information from each of a plurality of trading sub-models; wherein each sub-model is based on a different time of day, said calculation based on said received asset price data;
   (e) calculating a trade recommendation regarding said asset based on said trade recommendation information from each of said trading sub-models.

2. A method as in claim 1, wherein 24 sub-models are used.

3. A method as in claim 1, further comprising the step of evaluating the performance of said sub-models using a risk-sensitive performance measure.

4. A method as in claim 3, wherein said risk-sensitive performance measure is used to optimize the performance of the trading models.

5. A method as in claim 3, wherein said risk-sensitive performance measure is an effective return.

6. A method as in claim 1, wherein each sub-model comprises:
   (a) a price collector component;
   (b) a price filter component;
   (c) a price database component;
   (d) a gearing calculator component;
   (e) a deal acceptor component; and
   (f) a book-keeper component.

7. A method as in claim 1, wherein the step of calculating a trade recommendation regarding said asset based on said trade recommendation information from each of said trading sub-models is performed by summing weighted trade recommendations of the sub-models.

8. A method as in claim 1, wherein the step of calculating a trade recommendation regarding said asset based on said trade recommendation information from each of said trading sub-models is performed by summing weighted trade recommendations of N sub-models within the last T hours, where N and T are positive integers.

9. A method as in claim 1, wherein the step of calculating a trade recommendation regarding said asset based on said trade recommendation information from each of said trading sub-models is based on a ratio obtained by summing weighted trade recommendations of N sub-models within the last T hours, where N and T are positive integers and dividing that sum by the total number of sub-models.

10. A method as in claim 1, wherein each sub-model is based on a triplet comprising price change and volatility data calculated at regular intervals of a basic grid interval.

11. A method as in claim 10, wherein the volatility is measured as a mean of absolute log price change.

12. A method as in claim 11, wherein the mean is taken over the last M consecutive observations of log price change over the basic grid interval, where M is a positive integer.

* * * * *